(12) United States Patent
Jitsukawa et al.

(10) Patent No.: US 9,198,166 B2
(45) Date of Patent: Nov. 24, 2015

(54) WIRELESS COMMUNICATION SYSTEM, BASE STATION, MOBILE STATION, AND WIRELESS COMMUNICATION METHOD

(71) Applicant: FUJITSU LIMITED, Kawasaki-shi, Kanagawa (JP)

(72) Inventors: Daisuke Jitsukawa, Adachi (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 211 days.

(21) Appl. No.: 13/937,681

(22) Filed: Jul. 9, 2013

(65) Prior Publication Data
US 2013/0303178 A1    Nov. 14, 2013

Related U.S. Application Data

(63) Continuation of application No. PCT/JP2011/051951, filed on Jan. 31, 2011.

(51) Int. Cl.
*H04W 72/00* (2009.01)
*H04W 72/04* (2009.01)
*H04W 84/04* (2009.01)
(Continued)

(52) U.S. Cl.
CPC ......... *H04W 72/0406* (2013.01); *H04L 5/0048* (2013.01); *H04L 5/0053* (2013.01); *H04L 5/0094* (2013.01); *H04W 72/0426* (2013.01); *H04W 72/082* (2013.01); *H04W 84/045* (2013.01)

(58) Field of Classification Search
CPC .......... H04W 72/0406; H04W 72/082; H04W 72/0426; H04W 84/045; H04L 5/0094; H04L 5/0048; H04L 5/0053

USPC .......................................................... 455/450
See application file for complete search history.

(56) References Cited

U.S. PATENT DOCUMENTS

| 8,787,275 | B2 * | 7/2014 | Nishio et al. | 370/329 |
| 2010/0027471 | A1 * | 2/2010 | Palanki et al. | 370/328 |
| 2010/0151873 | A1 * | 6/2010 | Gorokhov et al. | 455/452.1 |

(Continued)

FOREIGN PATENT DOCUMENTS

| JP | 2010-171885 A | 8/2010 |
| WO | 2010/097241 A1 | 9/2010 |
| WO | 2010/124865 A2 | 11/2010 |

OTHER PUBLICATIONS

Huawei, CMCC; "Search spaces on one CC for the cross-CC scheduling"; Agenda Item: 6.2.3.2; 3GPP TSG RAN WG1 meeting #61; R1-103083; Montreal, Canada; May 10-14, 2010.

(Continued)

*Primary Examiner* — Nathan Mitchell
(74) *Attorney, Agent, or Firm* — Myers Wolin, LLC

(57) ABSTRACT

A wireless communication system controls a transmission timing in each cell so that a control channel of a first cell and a data channel of a second cell temporally overlap each other. The wireless communication system includes a base station of the first cell. The base station of the first cell includes a first control unit and a first communicating unit. The first control unit notifies a base station of the second cell information used to specify a resource of the control channel of the first cell. The first control unit sets a resource of the control channel of the first cell. The first communicating unit notifies the mobile station of the first cell of information for decoding the first resource and transmits a control signal to the mobile station of the first cell by using the first resource.

17 Claims, 17 Drawing Sheets

(51) Int. Cl.
 H04L 5/00 (2006.01)
 H04W 72/08 (2009.01)

(56) References Cited

U.S. PATENT DOCUMENTS

2011/0223923 A1* 9/2011 Cho et al. ............... 455/448
2012/0069803 A1* 3/2012 Iwamura et al. ......... 370/329

OTHER PUBLICATIONS

Fujitsu; "Interference coordination for control channels for HetNet"; Agenda Item: 6.8; 3GPP TSG-RAN WG1 Meeting #61; R1-103227; Montreal, Canada; May 10-14, 2010.
Fujitsu; "Interference coordination for control channels in macro-femto deployment"; Agenda Item: 6.8.1; 3GPP TSG-RAN WG1 Meeting #62; R1-104884; Madrid, Spain; Aug. 23-27, 2010.
Fujitsu; "Potential gains of cell range expansion in macro-pico deployment"; Agenda Item: 6.8.1.2; 3GPP TSG-RAN WG1 Meeting #62bis; R1-105682; Xi'An, P.R.China; Oct. 11-15, 2010.
3GPP TS 36.213 V8.8.0; 3rd Generation Partnership Project; Technical Specification Group Radio Access Network; Evolved Universal Terrestrial Radio Access (E-UTRA); "Physical layer procedures (Release 8)"; Sep. 2009.
3GPP TS 36.211 V8.9.0; 3rd Generation Partnership Project; Technical Specification Group Radio Access Network; Evolved Universal Terrestrial Radio Access (E-UTRA); "Physical Channels and Modulation (Release 8)"; Dec. 2009.
3GPP TR 36.814 V9.0.0; 3rd Generation Partnership Project; Technical Specification Group Radio Access Network; Evolved Universal Terrestrial Radio Access (E-UTRA); "Further advancements for E-UTRA physical layer aspects (Release 9)"; Mar. 2010.
International search report issued for corresponding International Patent Application No. PCT/JP2011/051951, mailed Apr. 5, 2011, with English translation.
Notice of Preliminary Rejection issued for corresponding Korean Patent Application No. 10-2013-7019919 mailed on Jan. 21, 2015 with an English translation.
International Search Report issued for corresponding International Patent Application No. PCT/JP2011/051948, mailed Mar. 8, 2011 with an English translation.
Notice of Rejection issued for corresponding Japanese Patent Application No. 2012-555595, mailed on Jul. 22, 2014 with an English translation.
Office Action issued for corresponding Japanese Patent Application No. 2012-555595, mailed on Feb. 17, 2015 with a partial English translation.
Motorola, "Reliable Downlink Control for Heterogeneous Networks", Agenda Item: 7.7, 3GPP TSG RAN1 #58bis, R1-093971, Miyazaki, Japan, Oct. 12-16, 2009.
Intel Corporation (UK) Ltd, "Non-CA based PDCCH Interference Mitigation in LTE-A", Agenda Item: 6.8, 3GPP TSG RAN WG1 Meeting #61, R1-102814, Montreal, Canada, May 10-14, 2010.
Texas Instruments, "Rel-8/9 compatible PDCCH interference mitigation schemes for Het-Nets", Agenda Item: 6.8, 3GPP TSG RAN WG1 #61, R1-102831, Montreal, Canada, May 10-14, 2010.
Notice of Final Rejection issued for corresponding Korean Patent Application No. 10-2013-7020103 mailed on Jul. 29, 2015 with an English translation.
Non-Final Office Action issued by the United States Patent and Trademark Office for corresponding U.S. Appl. No. 13/940,548 electronically delivered on May 12, 2015.

* cited by examiner

NUMBER OF TRANSMISSION ANTENNAS =4, n=3, IN CASE OF SHORT CP
▨ : CELL-SPECIFIC RS ▨▨ : REG

FIG.14

| SUBFRAME NUMBER | 0 | 1 | 2 | 3 | 4 | 5 | 6 | 7 | 8 | 9 |
|---|---|---|---|---|---|---|---|---|---|---|
| PICOCELL C1 | 1 | 0 | 0 | 1 | 0 | 0 | 1 | 0 | 0 | 0 |
| PICOCELL C2 | 0 | 1 | 1 | 0 | 1 | 1 | 0 | 1 | 1 | 1 |

WIRELESS COMMUNICATION SYSTEM, BASE STATION, MOBILE STATION, AND WIRELESS COMMUNICATION METHOD

CROSS-REFERENCE TO RELATED APPLICATION

This application is a continuation application of International Application PCT/JP2011/051951, filed on Jan. 31, 2011, and designating the U.S., the entire contents of which are incorporated herein by reference.

FIELD

The embodiments discussed herein are directed to a wireless communication system, a base station, a mobile station, and a wireless communication method.

BACKGROUND

Conventionally, for LTE (Long Term Evolution) or LTE-Advanced as a next generation mobile communication system, a heterogeneous network has been studied in order to improve system capacity and coverage. The heterogeneous network is a network in which a macrocell and a cell of a base station with low transmission power (hereinafter, described as a "picocell") are arranged so as to coexist with each other. In such a network, when the macrocell and the picocell are operated at the same frequency, interference from the macrocell to the picocell becomes a problem. Namely, in a mobile station connected to a base station of the picocell (hereinafter, described as a "pico base station"), a signal from the pico base station is interfered with by a signal from a base station of the macrocell (hereinafter, described as a "macro base station").

The inter-cell interference as described above influences the communication quality in each of physical channels (a control channel and a data channel). In particular, in a system in which a transmission timing of a subframe is synchronized between cells, the inter-cell interference may occur between the control channels and between the data channels. As a technology for reducing the inter-cell interference, there is a technology for shifting a transmission timing of a subframe in the pico base station with respect to a transmission timing of a subframe in the macro base station, in an OFDM (Orthogonal Frequency Division Multiplexing) symbol unit. In such a technology, a data channel of the macro base station that overlaps a control channel of the pico base station in the time domain as a result of the shift is overwritten (muting) with a null symbol with transmission power of zero.

Non Patent Literature 1: 3GPP TR 36.814 V9.0.0 (March 2010)
Non Patent Literature 2: 3GPP TS 36.211 V8.9.0 (December 2009)
Non Patent Literature 3: 3GPP TS 36.213 V8.8.0 (November 2009)
Non Patent Literature 4: 3GPP R1-103227

However, in the technology described above, while interference from the data channel of the macro base station to the control channel of the pico base station is reduced, there is a problem in that the reception characteristics of the data channel of the macro base station is degraded. Namely, because a null symbol is set in a resource that is muted to reduce the interference among resources of the data channel of the macro base station, the amount of data that the macro base station can transmit per unit time is reduced accordingly. The reduction in the amount of transmission data is a cause of degradation of the reception characteristics of the data channel.

SUMMARY

According to an aspect of the embodiments, a wireless communication system controls a transmission timing in each of cells so that a control channel of a first cell and a data channel of a second cell temporally overlap each other. A base station of the first cell includes a first control unit that notifies a base station of the second cell of information used to specify a resource of the control channel of the first cell, the resource corresponding to a predetermined resource unit, and that sets a resource of the control channel of the first cell as a first resource, the first resource serving as a decoding object of a mobile station of the first cell and corresponding to at least a part of the predetermined resource unit; and a first communicating unit that notifies the mobile station of the first cell of information for decoding the first resource according to a setting of the first resource made by the first control unit, and that transmits a control signal to the mobile station of the first cell by using the first resource. The base station of the second cell includes a second communicating unit that transmits a null symbol by using a second resource of the data channel of the second cell, the second resource corresponding to the predetermined resource unit. The mobile station of the first cell includes a third communicating unit that receives the control signal transmitted by the base station of the first cell via the first resource and receives the null symbol transmitted by the base station of the second cell via the second resource.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating an example of interference reducing subframe information according to the third embodiment;

DESCRIPTION OF EMBODIMENTS

Preferred embodiments of a wireless communication system disclosed in the present application will be explained in detail below with reference to accompanying drawings. The present invention is not limited to the embodiments below.

Figure 1:
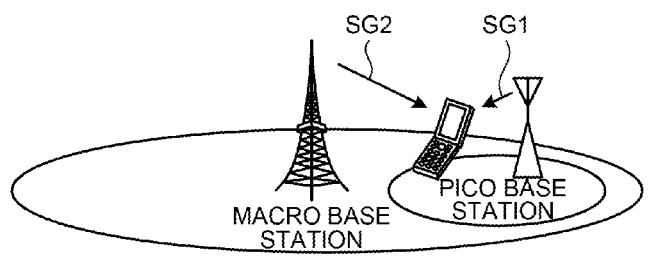
FIG. 1 is a diagram illustrating an example of a heterogeneous network.

First, a technology as a basis of the wireless communication system disclosed in the present application will be explained with reference to FIG. 1 to FIG. 6. FIG. 1 is a diagram illustrating an example of a heterogeneous network. As illustrated in FIG. 1, when a macrocell and a picocell are operated in a mixed manner, a downlink desired signal SG1 from a pico base station to a mobile station connected to the pico base station is greatly influenced by an interference signal SG2 from a macro base station. Therefore, the communication quality is greatly reduced.

Figure 2:
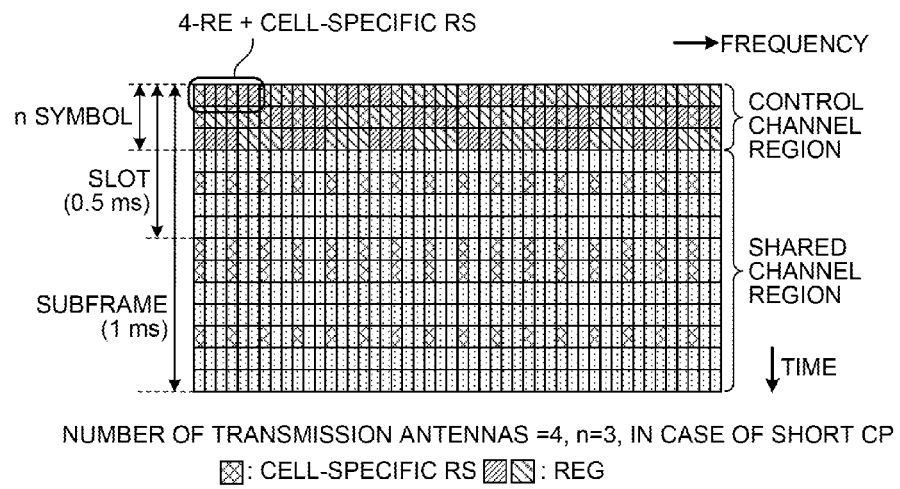
FIG. 2 is a diagram for explaining a mapping method of each physical channel.

Before explanation of an influence of the inter-cell interference on each physical channel, a configuration of each physical channel and a method of mapping to a time-frequency resource will be explained below with reference to FIG. 2. FIG. 2 is a diagram for explaining a mapping method of each physical channel. As illustrated in FIG. 2, a subframe with the length of 1 ms is constituted of 14 OFDM symbols in the time domain, and a control channel is mapped to first n (=1 to 3) OFDM symbols. Examples of the control channel include a PCFICH (Physical Control Format Indicator CHannel), a PHICH (Physical Hybrid ARQ Indicator CHannel), and a PDCCH (Physical Downlink Control CHannel).

The value of n is defined as control information called a CFI (Control Format Indicator). Shared channels PDSCH (Physical Downlink Shared CHannel) used to transmit user data or the like are mapped to the remaining OFDM symbols. In the frequency domain, an RB (Resource Block) serving as a unit for allocating a frequency resource is constituted of 12 subcarriers, and shared channels for each user are frequency-division multiplexed in an RB unit. A cell-specific reference signal (Cell-specific RS (Reference Signal)) used for channel estimation or the like is sparsely mapped in the time and frequency domains. As a minimum unit of the time-frequency resource, an RE (Resource Element) that is a region bounded by one OFDM symbol and one subcarrier is defined. As a mapping unit of the control channel, an REG (Resource Element Group) constituted of four consecutive REs except for the RS in the frequency domain is defined.

Of all the physical channels described above, in particular, a mapping method of the control channel will be explained in detail below. The PCFICH is a physical channel used to transmit a CFI. Four REGs for the PCFICH are mapped so as to be distributed at approximately equal intervals within a system bandwidth with a starting point at the position of a subcarrier dependent on a cell ID in the first OFDM symbol in the subframe.

The PHICH is a physical channel used to transmit ACK/NACK information on an uplink shared channel. The number of PHICH groups is determined depending on a parameter Ng notified by a higher-level layer, and three REGs are used for each of the PHICH groups. The three REGs are mapped so as to be distributed at approximately equal intervals within a system bandwidth with a starting point at the position of the subcarrier dependent on the cell ID among REGs to which the PCFICH is not mapped.

Figure 3:
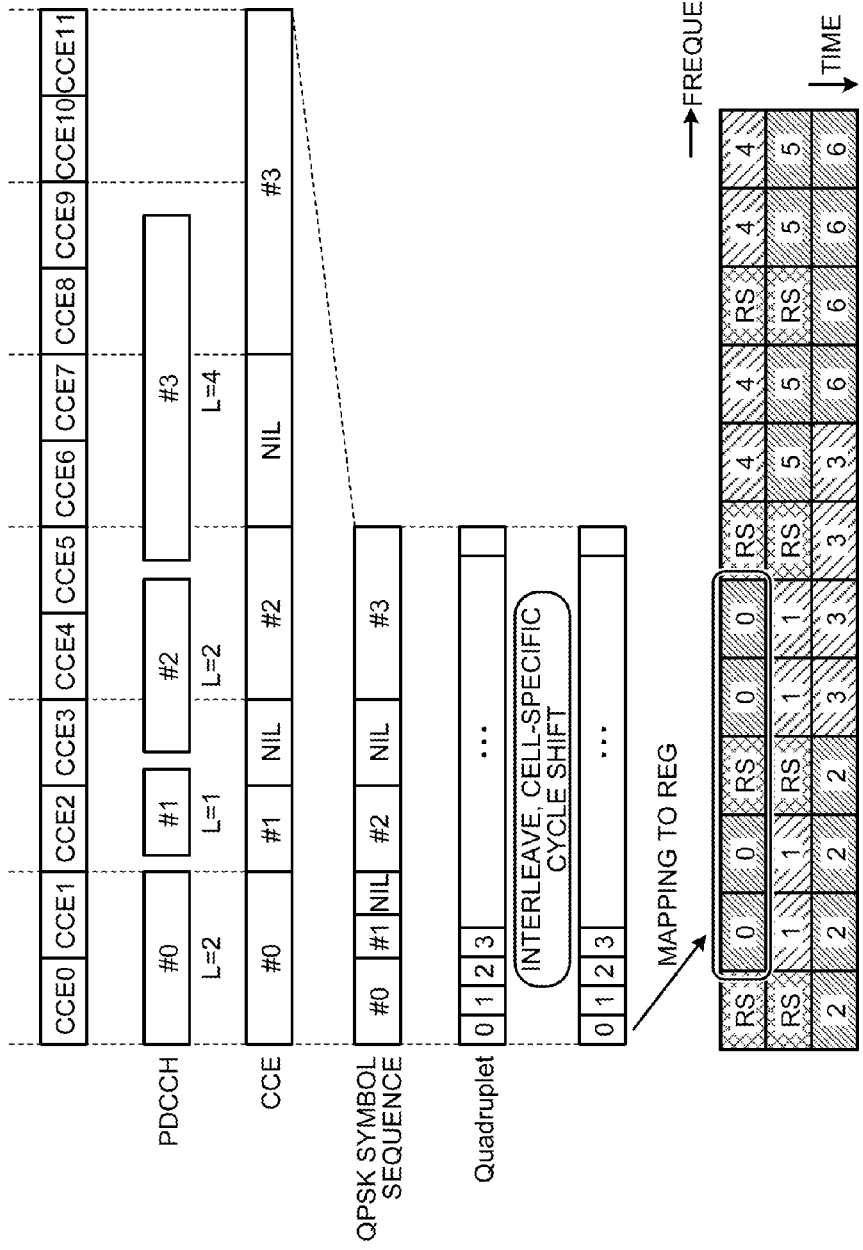
FIG. 3 is a diagram for explaining a mapping method of a PDCCH.

The PDCCH is a physical channel used to transmit notification information and scheduling information on user data. FIG. 3 is a diagram for explaining a method of mapping a PDCCH. A CCE (Control Channel Element) is defined as a resource unit used by each PDCCH. The CCE is constituted of nine REGs (=36 REs). An aggregation level (hereinafter, described as an "AL") is a parameter corresponding to the number of CCEs used by the PDCCH, that is, a spreading factor. The AL is set to any of {1, 2, 4, 8} by a base station according to the state of a wireless channel or the like. While details will be explained later, each PDCCH is multiplexed by being added with appropriate offset, and is modulated by QPSK (Quadrature Phase Shift Keying). Each PDCCH is interleaved in units of four modulation symbols, and thereafter mapped to an REG to which the PCFICH or the PHICH is not mapped.

Incidentally, the mobile station is not notified of a PDCCH multiplexing position by the base station. Therefore, the mobile station searches for candidates for possible multiplexing positions when decoding the PDCCH, and attempts to decode each receiving signal. To limit the number of times of decoding to the extent that the mobile station can process, a concept of a search space (hereinafter, described as an "SS") has been introduced. Therefore, the base station multiplexes the PDCCH at an arbitrary location within the limited search space, and the mobile station searches through only the search space for an attempt of decoding.

Figure 4:
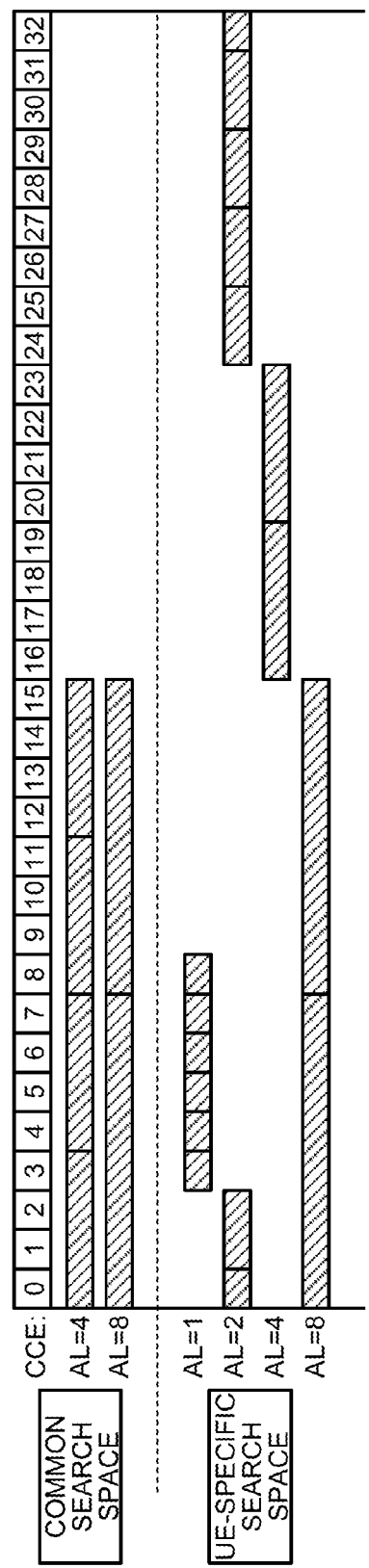
FIG. 4 is a diagram for explaining a search space of the PDCCH.

FIG. 4 is a diagram for explaining a search space of the PDCCH. FIG. 4 illustrates an example of search spaces in a certain subframe when 33 CCEs are available. A common search space (Common Search Space) provided for a PDCCH that transmits the scheduling information of the notification information is always fixed to the first 16 CCEs. The head position of a search space specific to the mobile station (UE (User Equipment) Specific Search Space) provided for the PDCCH that transmits the scheduling information on user data differs for each of RNTIs of the mobile stations, the ALs, and the subframes. The head position is determined by a hash function. The RNTI (Radio Network Temporary Identifier) is an identifier of a mobile station assigned by a base station to which the mobile station is connected. The number of available CCEs may change depending on a system bandwidth, an antenna configuration, a CFI, or Ng.

Figure 5:
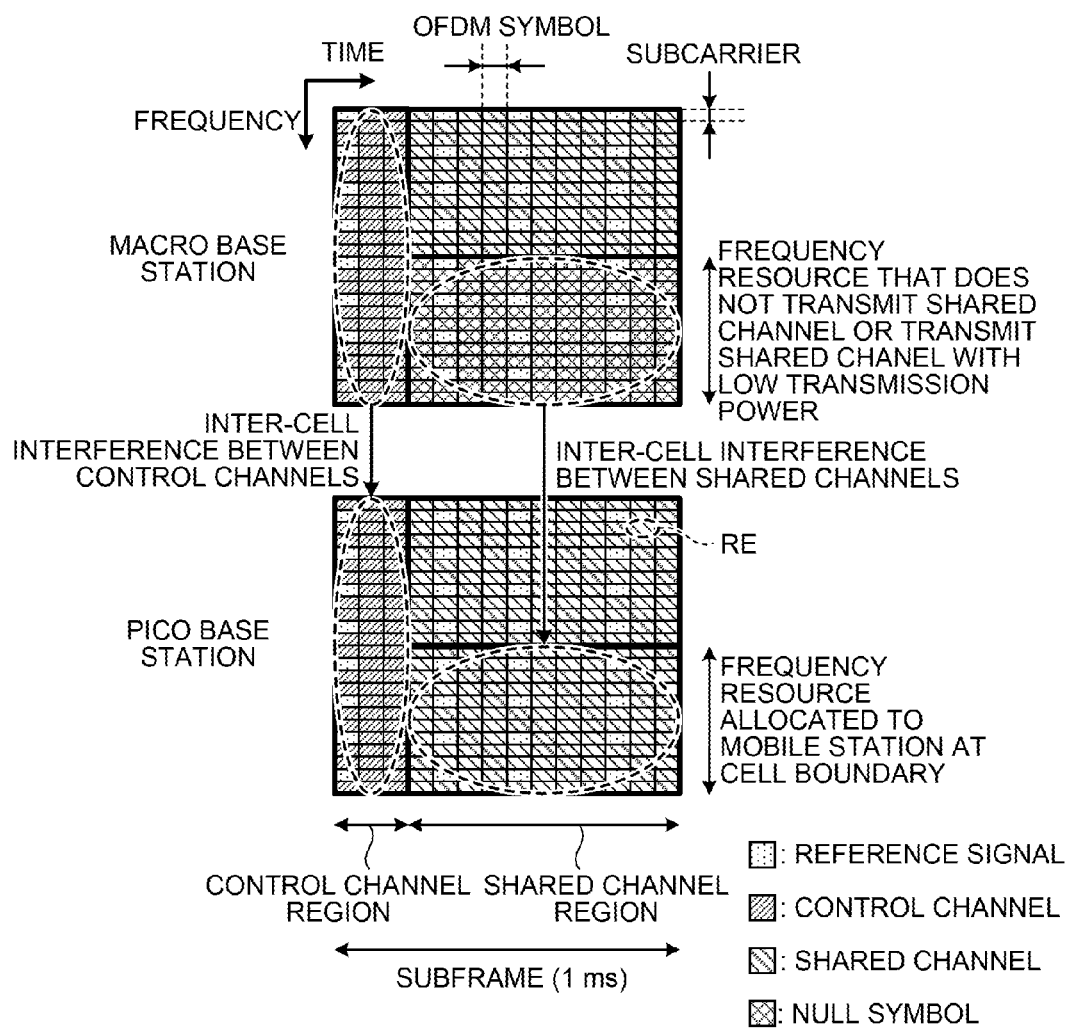
FIG. 5 is a diagram illustrating how a time-frequency resource for a transmission signal of a macro base station and a pico base station is allocated.

An influence of the inter-cell interference on each of the physical channels will be explained below. FIG. 5 is a diagram illustrating how a time-frequency resource for a transmission signal of the macro base station and the pico base station is allocated. In a system in which a transmission timing of a subframe is synchronized between cells, the inter-cell interference may occur between the shared channels and between the control channels. In LTE (Release-8), an FFR (Fractional Frequency Reuse) technology is applicable in order to reduce the inter-cell interference. For example, regarding the shared channels, specific RBs are allocated to the shared channels of a mobile station at a cell boundary in the pico base station. Meanwhile, in the macro base station, the shared channels are not transmitted by the RBs or transmitted with low transmission power so that the inter-cell interference can be reduced.

Figure 6:
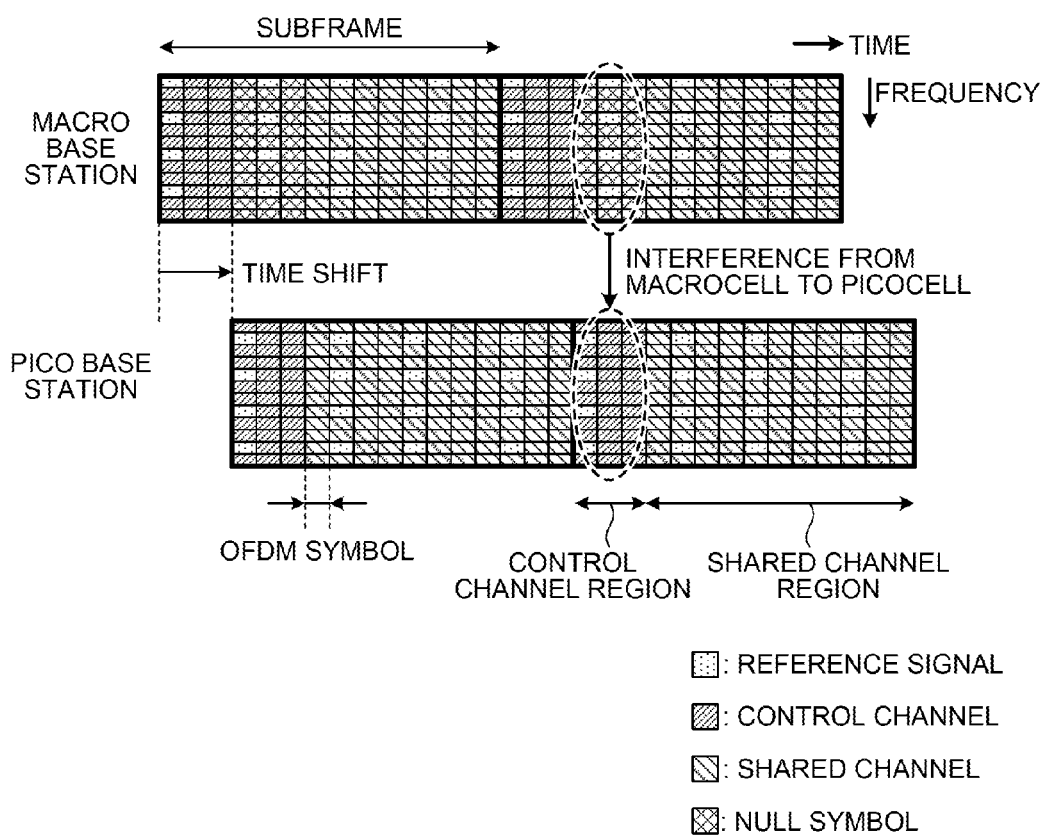
FIG. 6 is a diagram for explaining how a frequency resource for a transmission signal of each of the base stations is allocated.

However, in the technology described above, it is difficult to apply the FFR to the control channels because the control channels are arranged in a distributed manner in the whole system bandwidth. As a method for reducing the inter-cell interference in the control channels, there is a method as illustrated in FIG. 6. FIG. 6 is a diagram for explaining how a frequency resource for a transmission signal of each base station is allocated. As illustrated in FIG. 6, a transmission timing of the pico base station is first shifted in an OFDM symbol unit with respect to the macro base station. Subsequently, shared channels of the macro base station overlapping control channels of the pico base station are overwritten (muting) with null symbols with transmission power of 0 (zero). Therefore, the interference from the macrocell to the control channels of the picocell can be reduced. However, as described above, the reception characteristics of the shared channels of the macrocell are degraded.

First Embodiment

Figure 7:
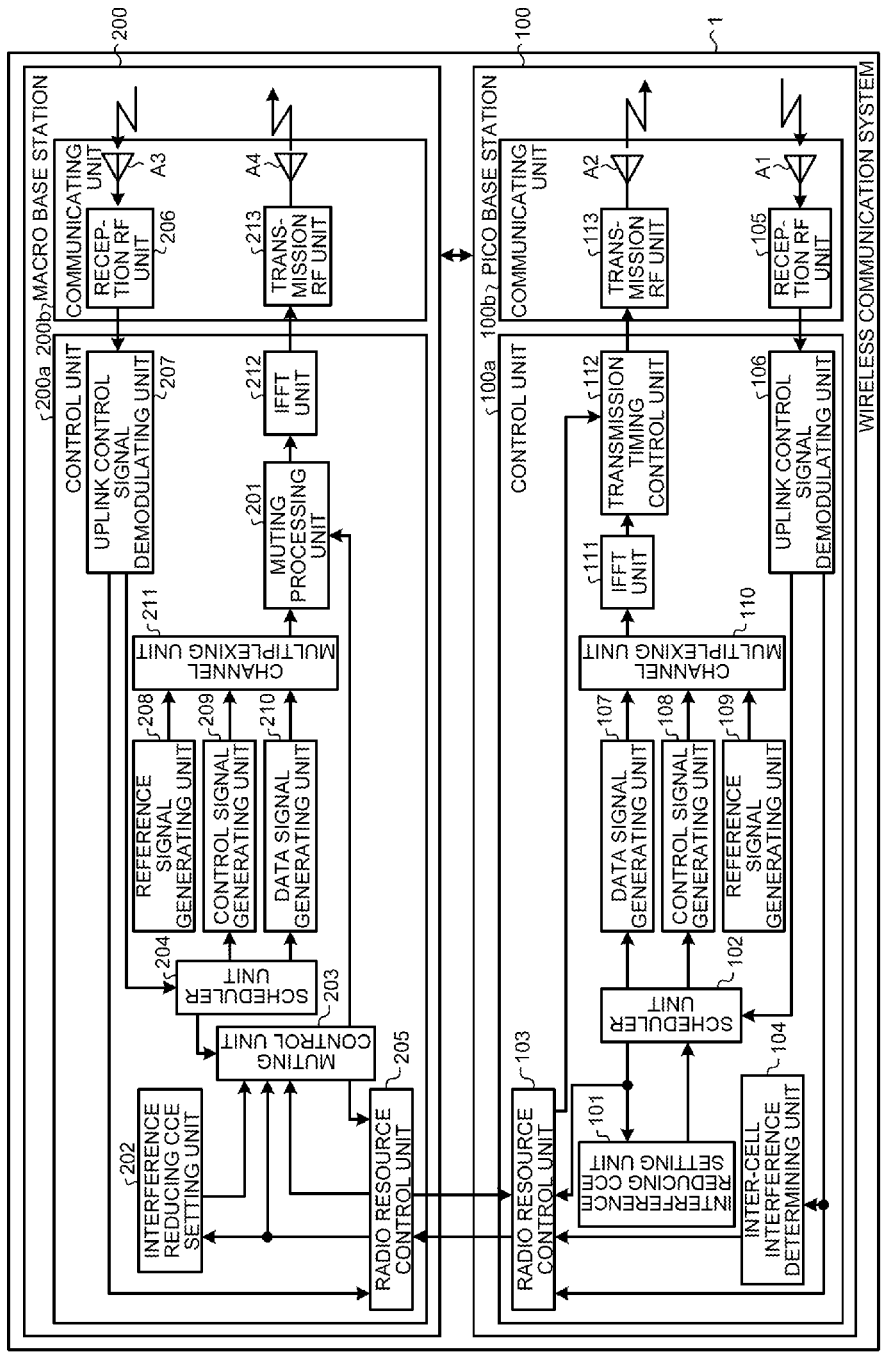
FIG. 7 is a diagram illustrating a configuration of a wireless communication system according to a first embodiment.

A configuration of a wireless communication system according to an embodiment disclosed in the present application will be explained below. FIG. 7 is a diagram illustrating a configuration of a wireless communication system according to a first embodiment. As illustrated in FIG. 7, a wireless communication system 1 includes a pico base station 100 and a macro base station 200. The pico base station 100 includes a control unit 100a and a communicating unit 100b. The control unit 100a includes an interference reducing CCE setting unit 101, a scheduler unit 102, a radio resource control unit 103, an inter-cell interference determining unit 104, an uplink control signal demodulating unit 106, and a data signal generating unit 107. The control unit 100a also includes a control signal generating unit 108, a reference signal generating unit 109, a channel multiplexing unit 110, an IFFT (Inversed Fast Fourier Transform) unit 111, and a transmission timing control unit 112. The communicating unit 100b includes a reception RF unit 105 and a transmission RF (Radio Frequency) unit 113. All of the components are connected to one another so as to be able to input and output a signal or data unidirectionally or bidirectionally. The control unit 100a is physically constructed of a digital circuit, a DSP (Digital Signal Processor), a CPU (Central Processing Unit), or the like, and the communicating unit 100b is physically constructed of an analog circuit including an amplifier and a filter, or the like.

The interference reducing CCE setting unit 101 sets an interference reducing CCE based on a wireless parameter of the picocell, and notifies the scheduler unit 102 of the interference reducing CCE.

The scheduler unit 102 transfers an SS switching instruction, as data information for an interfered pico UE (User Equipment, a mobile station), to the data signal generating unit 107 together with the user data based on the interfered UE information. The scheduler unit 102 differs in the above point from a normal scheduler unit 204 (of the macro base station 200) to be described later. The scheduler unit 102 sets an SS dedicated for the interfered pico UE on the interference reducing CCE, and allocates a CCE on the SS dedicated for the interfered pico UE to a PDCCH for the interfered pico UE. The scheduler unit 102 determines allocation of a frequency resource to a data signal for each of mobile stations, determines an MCS (Modulation and Coding Scheme), and determines the number of information bits or the like based on the channel quality information (CQI (Channel Quality Indicator)) notified by each of the mobile stations. The scheduler unit 102 also determines the CFI according to the number of the mobile stations, and allocates an available CCE to a PDCCH for each of the mobile stations.

The radio resource control unit 103 notifies a radio resource control unit 205 of the macro base station 200 of a muting request signal and a wireless parameter (the number of antennas, a CFI, a cell ID, or Ng) needed to specify the CCE of the picocell. The notification is performed via a wired interface. The radio resource control unit 103 receives information on the amount of time shift to be described later from the radio resource control unit 205. The radio resource control unit 103 controls handover based on information on the received power (RSRP (Reference Signal Received Power)) of each cell notified by each of the mobile stations.

The inter-cell interference determining unit 104 estimates the state of the inter-cell interference in each of the mobile stations based on the information on the RSRP of each cell notified by each of the mobile stations, and determines whether to request application of muting (an overwriting process with a null symbol). The determination result is transferred, as a muting request signal, to the radio resource control unit 103. The inter-cell interference determining unit 104 also calculates the number of the interfered pico UEs, and transfers the calculation result, as interfered UE information, to the scheduler unit 102.

The transmission timing control unit 112 shifts a transmission timing of a downlink signal in an OFDM symbol unit based on the information on the amount of time shift.

Similarly, the macro base station 200 includes a control unit 200a and a communicating unit 200b. The control unit 200a includes a muting processing unit 201, an interference reducing CCE setting unit 202, a muting control unit 203, a scheduler unit 204, a radio resource control unit 205, and an uplink control signal demodulating unit 207. The control unit 200a also includes a reference signal generating unit 208, a control signal generating unit 209, a data signal generating unit 210, a channel multiplexing unit 211, and an IFFT unit 212. The communicating unit 200b includes a reception RF unit 206 and a transmission RF unit 213. All of the components are connected to one another so as to be able to input and output a signal or data unidirectionally or bidirectionally. The control unit 200a is physically constructed of a digital circuit, a DSP, a CPU, or the like, and the communicating unit 200b is physically constructed of an analog circuit including an amplifier and a filter, or the like.

The muting processing unit 201 performs a muting process based on muting control information transferred by the muting control unit 203.

The interference reducing CCE setting unit 202 sets an interference reducing CCE based on a wireless parameter of the picocell, and notifies the muting control unit 203 of the interference reducing CCE.

The muting control unit 203 determines execution of muting based on the muting request, and sets, as a muting region, a PDSCH RE of a macrocell corresponding to the interference reducing CCE of the picocell. Thereafter, the muting control unit 203 notifies the muting processing unit 201 of muting region information. The muting control unit 203 determines the amount of time shift of the picocell, and notifies the radio resource control unit 205 of the amount of time shift.

The scheduler unit 204 determines allocation of a frequency resource to a data signal for each of the mobile stations, determines an MCS (Modulation and Coding Scheme), and determines the number of information bits or the like, based on the CQI notified by each of the mobile stations. The scheduler unit 204 also determines the CFI according to the number of the mobile stations, and allocates an available CCE to a PDCCH for each of the mobile stations.

The radio resource control unit 205 notifies the radio resource control unit 103 of the pico base station 100 of the information on the amount of time shift via a wired interface. The radio resource control unit 205 receives the muting request signal and the wireless parameter (the number of antennas, a CFI, a cell ID, or Ng) of the picocell from the radio resource control unit 103. The radio resource control unit 205 controls handover based on the information on RSRP of each cell notified by each of the mobile stations.

As other components, the pico base station 100 and the macro base station 200 include a plurality of components that perform processing with common contents. The reception RF units 105 and 206 convert a radio frequency of an uplink received signal into a baseband, and perform quadrature demodulation and A/D (Analog-to-Digital) conversion. The reception RF units 105 and 206 include antennas A1 and A3, respectively, and receive uplink signals. The uplink control signal demodulating units 106 and 207 demodulate uplink control signals and restore the CQI and the RSRP, which are the control information, of each cell. The data signal generating units 107 and 210 generate data signals based on information on the resource allocation, the MCS, or the like. The control signal generating units 108 and 209 generate control signals based on control information containing the resource allocation information or the like. The reference signal generating units 109 and 208 generate reference signals. The channel multiplexing units 110 and 211 multiplex frequencies of the respective physical channels. The IFFT units 111 and 212 perform inverse Fourier transform (IFFT) and adds a CP (Cyclic Prefix). The transmission RF units 113 and 213 perform D/A conversion, quadrature modulation, and conversion from a baseband into a radio frequency, and transmit downlink signals with amplified power. The transmission RF units 113 and 213 include antennas A2 and A4, respectively, and transmit downlink signals.

Figure 8:
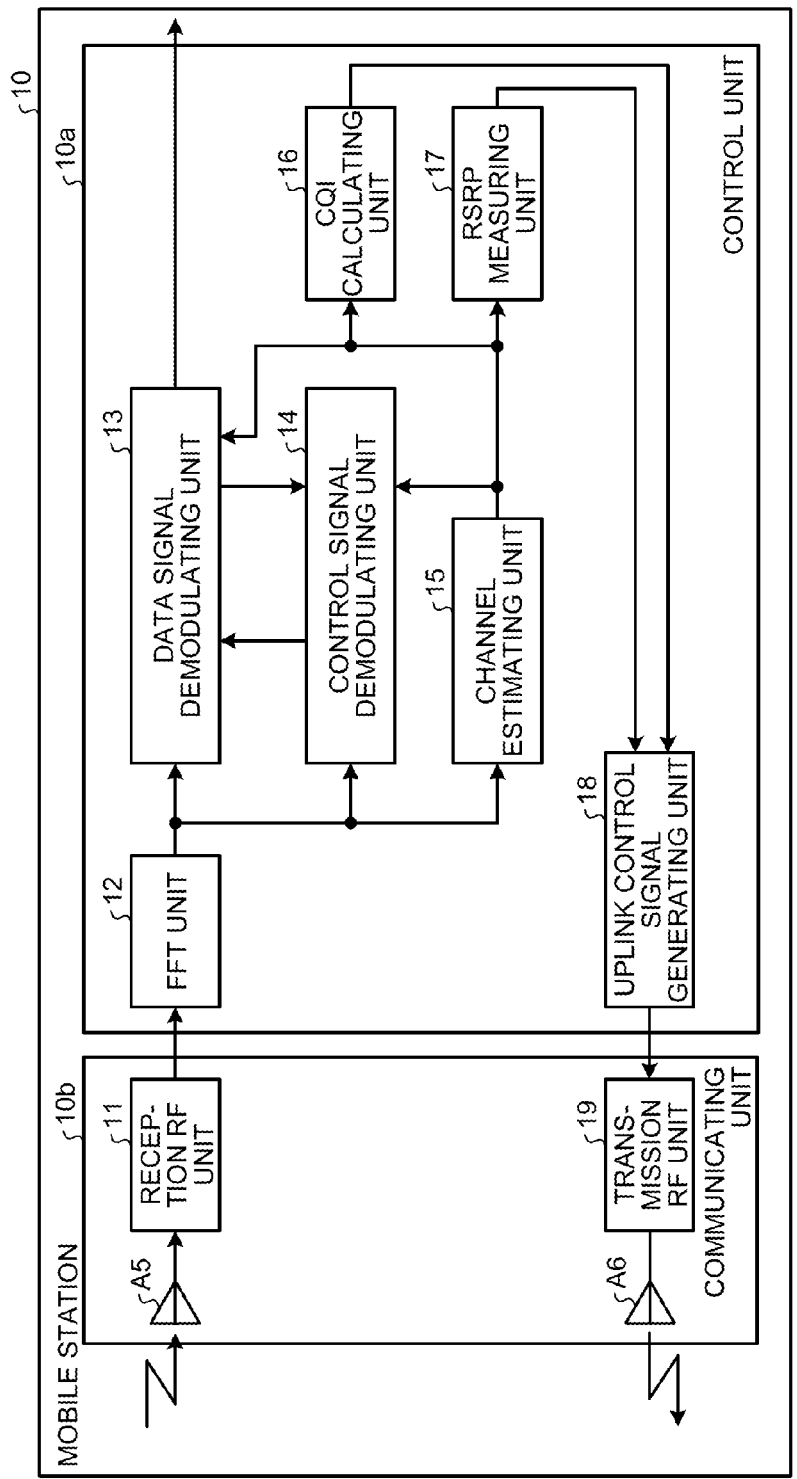
FIG. 8 is a diagram illustrating a configuration of a mobile station according to the first embodiment.

A configuration of a mobile station 10 will be explained below. FIG. 8 is a diagram illustrating a configuration of the mobile station according to the first embodiment. The mobile station 10 includes a control unit 10a and a communicating unit 10b. The control unit 10a includes an FFT unit 12, a data signal demodulating unit 13, a control signal demodulating unit 14, a channel estimating unit 15, a CQI calculating unit 16, an RSRP measuring unit 17, and an uplink control signal generating unit 18. The communicating unit 10b includes a reception RF unit 11 and a transmission RF unit 19. All of the components are connected to one another so as to be able to input and output a signal or data unidirectionally or bidirectionally. The control unit 10a is physically constructed of a digital circuit, a DSP, a CPU, or the like, and the communicating unit 10b is physically constructed of an analog circuit including an amplifier and a filter.

The reception RF unit 11 converts a radio frequency of a downlink received signal into a baseband, and performs quadrature demodulation and A/D conversion. The reception RF unit 11 receives a downlink signal via an antenna A5. The FFT (Fast Fourier Transform) unit 12 detects a timing to extract a received signal, removes a CP, and converts the detection result into a received signal in a frequency domain by Fourier transform (FFT), similarly to a typical OFDM system. The data signal demodulating unit 13 demodulates a data signal extracted from the received signal and restores data information based on the resource allocation information. The data information includes user data and control information (an SS switching instruction) on a higher-level layer.

The control signal demodulating unit 14 demodulates a control signal extracted from the received signal and restores the resource allocation information as the control information. When the SS switching instruction is notified, the control signal demodulating unit 14 switches a range of the CCEs to be searched for at the time of decoding a PDCCH from a normal UE-specific SS to an SS dedicated for an interfered pico UE. The channel estimating unit 15 calculates cross correlation between a reference signal extracted from the received signal and a replica of a known reference signal, to thereby obtain a channel estimation value. The channel estimation is performed not only on a cell to which the mobile station 10 is connected but also on surrounding cells. The CQI calculating unit 16 calculates channel quality information (a CQI as described above) by using the channel estimation value of the cell to which the mobile station 10 is connected. The RSRP measuring unit 17 measures the received power (the RSRP as described above) of the reference signal of each of the cells by using the channel estimation values of the cell to which the mobile station 10 is connected and the surrounding cells. The uplink control signal generating unit 18 generates an uplink control signal based on the control information containing the CQI and the RSRP of each of the cells. The transmission RF unit 19 performs D/A (Digital-to-Analog) conversion and quadrature modulation, and thereafter converts a baseband into a radio frequency and transmits an uplink signal with amplified power. The transmission RF unit 19 transmits an uplink signal via an antenna A6.

Figure 9:
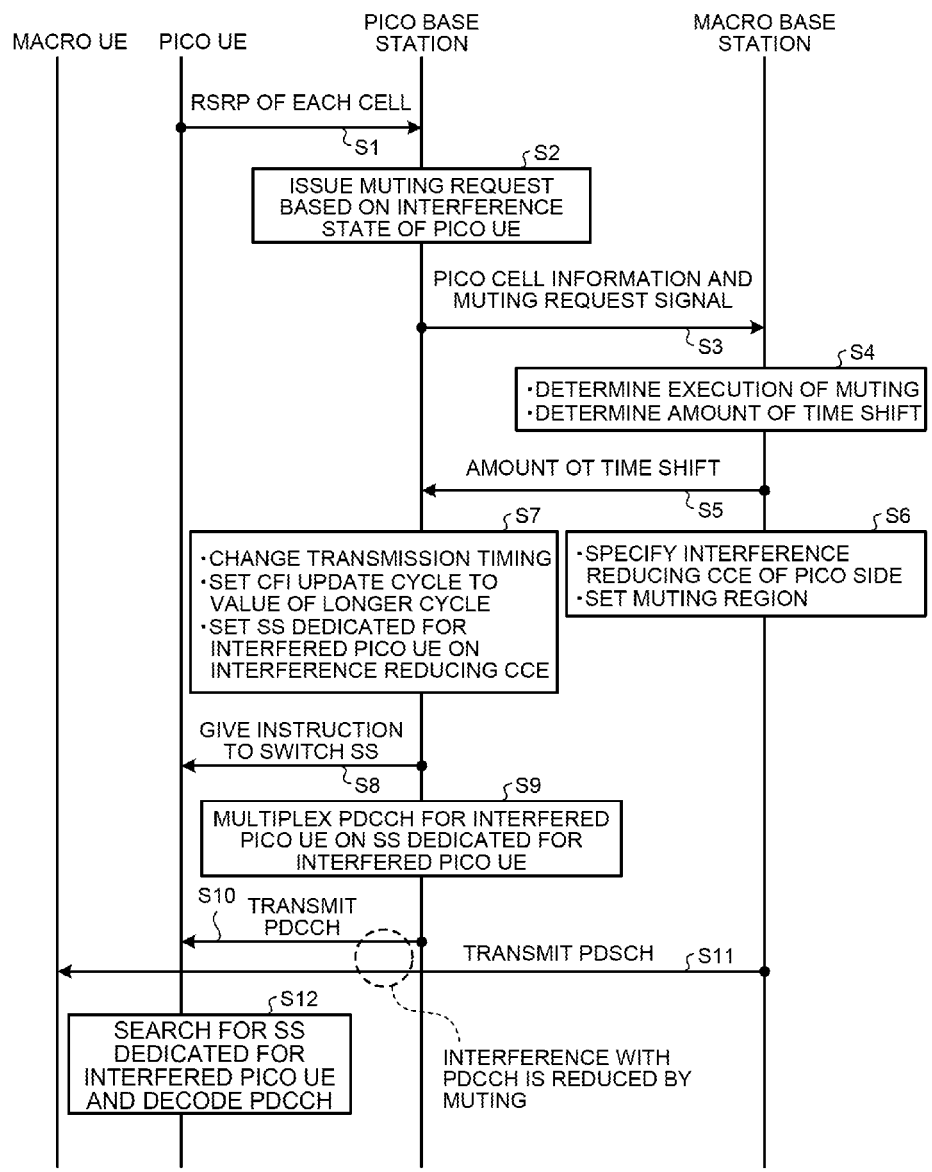
FIG. 9 is a diagram illustrating an operation of the wireless communication system according to the first embodiment.

An operation will be explained below. In the first embodiment, a network environment is assumed in which one picocell is mixed in a macrocell as illustrated in FIG. 1. FIG. 9 is a diagram illustrating an operation of the wireless communication system 1 according to the first embodiment. In the explanation below, a mobile station connected to the pico base station 100 is described as a pico UE and a mobile station connected to the macro base station 200 is described as a macro UE.

At S1, the pico UE measures the received power of an RS (Reference Signal) of each of the connected cell and the surrounding cells, and notifies the pico base station 100 of the measurement result as the RSRP.

At S2, the pico base station 100 estimates the state of inter-cell interference in each of pico UEs based on the information on the RSRP of each of the cells notified by each of the pico UEs, and determines whether to issue a muting request based on the estimation result. For example, assuming that the RSRP of the picocell as "RSRP_S" and the RSRP of an adjacent cell as "RSRP_I", a parameter $\alpha$=RSRP_S/RSRP_I represents the state of the inter-cell interference in the pico UE. Therefore, a mobile station for which $\alpha$ becomes smaller than a predetermined threshold (for example, an SINR (Signal to Interference and Noise Ratio) at which the block error rate of the PDCCH becomes 1% when AL=8 with the greatest resistance against interference is applied) is defined as an interfered pico UE. The number of the interfered pico UEs is used as a criterion, and application of muting is requested when the criterion becomes equal to or greater than a predetermined threshold (for example, 1). The criterion is not limited to the number of the interfered pico UEs but may be a ratio of the number of the interfered pico UEs to the total number of the pico UEs.

At S3, when requesting the application of muting, the pico base station 100 notifies the macro base station 200 of the muting request signal and a wireless parameter (the number of antennas, a CFI, a cell ID, or Ng) needed to recognize the CCE of the picocell.

At S4, the macro base station 200 determines execution of muting based on the muting request signal. The macro base station 200 determines an amount of time shift in the picocell. The amount of time shift is determined as, for example, the CFI of the macrocell or the upper-limit value of the CFI, which is 3.

At S5, the macro base station 200 notifies the pico base station 100 of the amount of time shift determined at S4.

At S6, the macro base station 200 specifies an interference reducing CCE of the picocell, and sets a muting region. Specifically, the macro base station 200 first calculates the number of CCEs allocatable in the picocell based on the wireless parameter of the picocell. Subsequently, the macro base station 200 defines a specific CCE (for example a common SS) of the picocell as an interference reducing CCE, and sets a corresponding PDSCH RE of the macrocell as the muting region.

At S7, the pico base station 100 changes a transmission timing based on the notified amount of time shift, and sets the CFI update cycle to a value of a longer cycle. This is because, because the muting region of the macrocell is determined based on the CFI of the picocell, if the CFI is frequently changed, recognition of the CFI becomes inconsistent between the macrocell and the picocell. The pico base station 100 also sets a specific CCE as the interference reducing CCE based on a rule shared with the macro base station 200, and sets an SS dedicated for an interfered pico UE on the interference reducing CCE.

Figure 10:
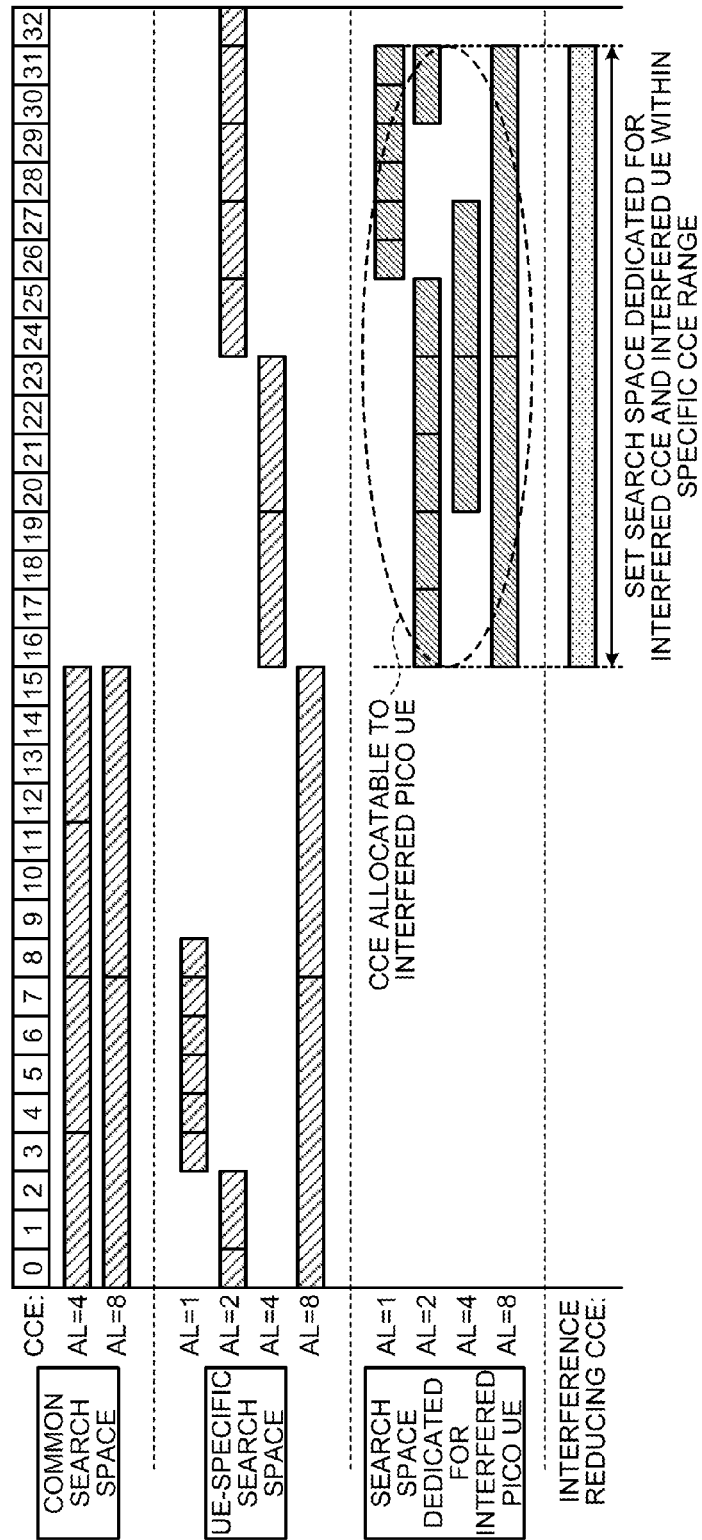
FIG. 10 is a diagram for explaining a PDCCH multiplexing method according to the first embodiment.

FIG. 10 is a diagram for explaining a PDCCH multiplexing method according to the first embodiment. At S7, as illustrated in FIG. 10, the pico base station 100 selects, for example, 16 CCEs (for example, the CCE numbers 16 to 31) from among 33 CCEs for the interfered pico UE, and sets an SS dedicated for the interfered pico UE in the 16 CCEs. In this case, the arrangement position of the SS dedicated for the interfered pico UE may be cell-specific (common to the UEs) or UE-specific. When the arrangement is UE-specific, for example, there is a method in which the pico base station 100 reassigns the CCE number in the interference reducing CCE and uses a calculation formula of the start position of the UE-specific SS to determine the start position of the SS dedicated for the interfered pico UE.

At S8, the pico base station 100 instructs the interfered pico UE to switch an SS to be searched for when the UE decodes a PDCCH from a normal UE-specific SS to the SS dedicated for the interfered pico UE. At S9, the pico base station 100 multiplexes the PDCCH for the interfered pico UE on the SS dedicated for the interfered pico UE, and multiplexes PDCCHs for the other pico UEs on the normal UE-specific SS.

Figure 11:
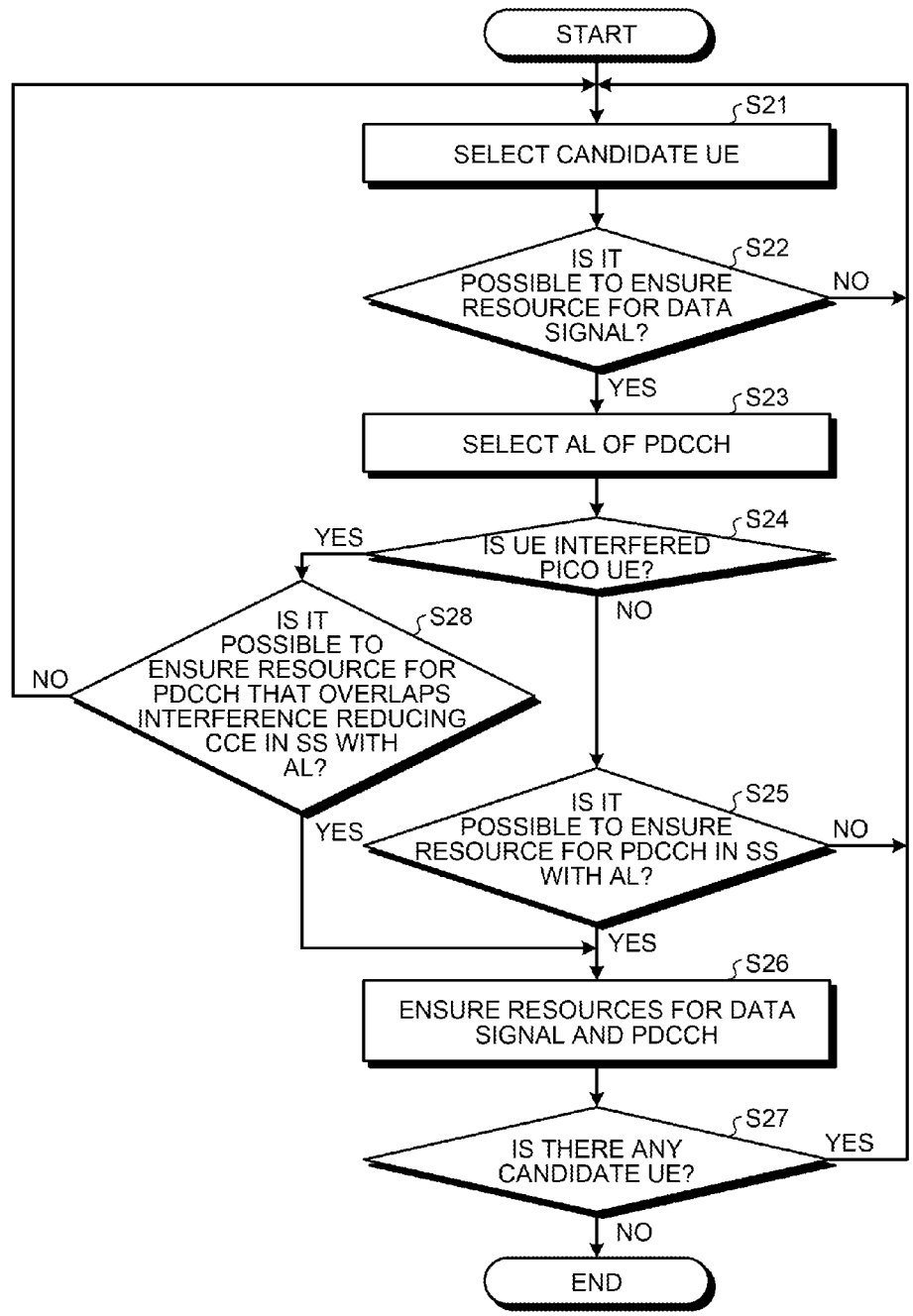
FIG. 11 is a diagram for explaining a scheduling algorithm in a pico base station according to the first embodiment.

FIG. 11 is a diagram for explaining a scheduling algorithm executed by the pico base station 100 at S9. First, the pico base station 100 selects a candidate UE for scheduling (S21), and determines whether it is possible to ensure a resource for a data signal (S22). As a result of the determination, when it is possible to ensure the resource (YES at S22), the pico base station 100 selects an AL (aggregation level) of the PDCCH (S23), and determines whether the UE selected at S21 is an interfered pico UE S21 (S24).

As a result of the determination at S24, when the UE selected at S21 is not the interfered pico UE (NO at S24), the pico base station 100 determines whether it is possible to ensure a resource for the PDCCH in the SS with the AL selected at S23 (S25). As a result of the determination, when it is possible to ensure the resource (YES at S25), the pico base station 100 ensures the resource for the data signal and the resource for the PDCCH (S26). Thereafter, the pico base station 100 searches for other UEs to be candidates for the scheduling (S27). When there is no other candidate UE (NO at S27), the scheduling process is finished.

As a result of the determination at S24, when the UE selected at S21 is an interfered pico UE (YES at S24), the pico base station 100 determines whether it is possible to ensure a resource for a PDCCH that overlaps an interference reducing CCE in the SS with the AL selected at S23 (S28). As a result of the determination, when it is possible to ensure the resource (YES at S28), the pico base station 100 performs the process at S26 as described above. On the other hand, when it is not possible to ensure the resource at S28 (NO at S28), the process returns to S21 and the subsequent processes are performed again.

When it is determined that it is not possible to ensure the resource at S22 and S25 (NO at S22 and NO at S25), the process returns to S21 and the subsequent processes are performed again similarly to the above.

A series of the processes at S21 to S28 described above is repeated until no candidate UE for a scheduling object remains (YES at S27), and is finished when the scheduling process on all of the candidate UEs is completed.

Referring back to FIG. 9, at S10, the pico base station 100 transmits a PDCCH for the interfered pico UE by using the interference reducing CCE.

At S11, the macro base station 200 transmits a PDSCH for the macro UE. At the time of the transmission, the macro base station 200 performs muting on a muting region corresponding to the interference reducing CCE. With the muting, interference from the macrocell to the PDCCH for the interfered pico UE in the picocell is reduced.

At S12, the interfered pico UE searches for the SS (the SS dedicated for the interfered pico UE) switched at S8, and decodes the PDCCH. The other pico UEs search for the normal UE-specific SS that remains unswitched, and decode the PDCCH.

The explanation of the operation with reference to the flowchart is complete.

As described above, the wireless communication system 1 of the first embodiment controls a transmission timing in each cell so that the PDCCH of the picocell and the PDSCH of the macrocell temporally overlap each other. The wireless communication system 1 includes the pico base station 100, the macro base station 200, and the pico mobile station 10. The pico base station 100 includes the control unit 100a and the communicating unit 100b. The control unit 100a notifies the macro base station 200 of information used to specify a resource of the PDCCH, where the resource corresponds to a predetermined resource unit. The control unit 100a sets a resource of the PDCCH, as a first resource serving as a decoding object of the pico mobile station 10 and corresponding to at least a part of the predetermined resource unit. The communicating unit 100b notifies the pico mobile station 10 of information for decoding the first resource in accordance with the setting of the first resource made by the control unit 100a, and transmits a control signal to the pico mobile station 10 by using the first resource. The macro base station 200 includes the communicating unit 200b that transmits a null symbol by using a second resource of the data channel of the macrocell, where the second resource corresponds to the predetermined resource unit. The pico mobile station 10 includes the communicating unit 10b that receives the control signal transmitted by the pico base station 100 via the first resource, and that receives a null symbol transmitted by the macro base station 200 via the second resource. Incidentally, the predetermined resource unit is one or more CCEs, and the first resource serving as a decoding object as above is, for example, a search space dedicated for the pico mobile station 10. Therefore, the wireless communication system 1 can reduce interference with the PDCCH while maintaining the reception characteristics of the PDSCH.

In the conventional technology described above, the PDSCH of the macrocell is muted in the OFDM symbol unit regardless of the position of the RE to which the PDCCH of the picocell is mapped. Therefore, the reception characteristics of the PDSCH of the macrocell may greatly be degraded. To reduce the degradation, it is effective that the macro base station specifies the position of the RE to which the PDCCH of the picocell is mapped, and performs muting on only a PDSCH RE of the macrocell overlapping the RE. However, it seems difficult for the macro base station to specify the position of the RE to which the PDCCH of the picocell is mapped for the following reasons. For example, the start position of a UE-specific SS of a PDCCH that transfers resource allocation information on a PDSCH used to transmit user data is determined based on the RNTI, the AL, and the subframe number. Therefore, it is needed to specify what RNTI and AL are set in what mobile station and also specify a position to which the PDCCH is mapped in the SS. However, it is difficult to transmit and receive the above pieces of information between the base stations at high speed. Therefore, the wireless communication system 1 according to the first embodiment introduces a new SS dedicated for a UE that is greatly interfered, in addition to the normal UE-specific SS, and performs muting on the PDSCH RE of the macrocell in association with the SS.

Furthermore, in the wireless communication system 1, the control unit 100a of the pico base station 100 notifies the macro base station 200 of a wireless parameter of the picocell as information needed to specify a resource to which the interference reducing CCE is mapped. The control unit 200a of the macro base station 200 specifies a resource to which the interference reducing CCE of the picocell is mapped based on the information on the wireless parameter notified by the pico base station 100. Therefore, the macro base station 200 can accurately recognize the position of the RE to which the PDCCH of the picocell is highly likely to be mapped.

Moreover, the control unit 100a of the pico base station 100 sets the SS dedicated for the interfered pico UE at a position in the interference reducing CCE. Therefore, opportunities to transmit the PDCCH for the interfered pico UE can be increased and the advantageous effects of the interference control as described above can be enhanced.

Furthermore, the control unit 100a of the pico base station 100 sets the SS dedicated for the interfered pico UE at an individual position for each of the mobile stations of the picocell. Therefore, it is possible to prevent the SS of each of the mobile station from being arranged disproportionately, so that opportunities of transmission by the PDCCH can be increased.

The control unit 100a of the pico base station 100 may set the SS dedicated for the interfered pico UE at a position shared with the mobile stations of the picocell.

Furthermore, the control unit 100a of the pico base station 100 sets the interference reducing CCE of the picocell so that the interference reducing CCE overlaps the common SS of the picocell. Therefore, the advantageous effects of the interference control as described above can also be achieved with respect to a control signal transferred on the common SS.

Second Embodiment

In a second embodiment, an example will be explained in which a bulk muting technology for a plurality of pico base stations is applied to the wireless communication system of the first embodiment. In the second embodiment, a network environment is assumed in which a plurality of picocells are mixed in a macrocell, which is different from the first embodiment.

In the second embodiment, it is concerned how the muting control unit 203 of the macro base station 200 determines whether muting is actually applied based on the muting request signal notified by a plurality of the pico base stations. A criterion for the determination may be based on whether the number of pico base stations that have requested application of muting exceeds a predetermined threshold.

As a first example, there is a case in which an emphasis is placed on reduction of interference from the macro base station 200 to the control channel of the pico base station 100 as a design principle of the mobile communication system. In this case, it is sufficient that the muting control unit 203 actually applies muting when one or more pico base stations have requested application of muting.

As a second example, there is a trade-off relation of the transmission efficiencies of the pico base station 100 and the macro base station 200. Specifically, while the reception characteristics of the pico base station 100 improves with an increase in the amount of muting, the reception characteristics of the macro base station 200 is sacrificed. In view of the above circumstances, there is a case in which an emphasis is placed on balancing between the characteristics. In this case, it is sufficient that the muting control unit 203 actually applies muting when over half of the pico base stations have requested application of muting.

A point that needs to be considered in the second embodiment is how to set interference reducing CCEs in a plurality of the pico base stations and how to set a muting region in the macro base station 200. For example, the muting control unit 203 defines a specific CCE of each of the picocells as an interference reducing CCE similarly to the first embodiment. A correspondence between the CCE and the position of an RE to which the CCE is mapped depends on the number of transmission antennas, a CFI, a cell ID, and Ng of each of the picocells. Therefore, the correspondence is not always the same between the picocells. Therefore, it is sufficient that the muting control unit 203 sets a muting region so as to include all of the REs to which the interference reducing CCEs of all of the picocells are mapped.

As described above, in the wireless communication system 1 according to the second embodiment, the macro base station 200 includes the control unit 200a and the communicating unit 200b. The control unit 200a calculates, for each of the picocells, an RE to which the interference reducing CCE of the picocell is mapped based on the wireless parameter of each of the picocells. The communicating unit 200b transmits a null symbol in each of the REs calculated by the control unit 200a by using the same subframe. Therefore, in the network environment in which a plurality of the picocells are mixed in the macrocell, a bulk muting technology for a plurality of the pico base stations can be applied to the wireless communication system of the first embodiment. As a result, it is possible to reduce interference from a single macrocell to the PDCCHs of the picocells.

Third Embodiment

In a third embodiment, an example will be explained in which a time-division muting technology for a plurality of pico base stations is applied to the wireless communication system of the first embodiment. In the third embodiment, a network environment is assumed in which a plurality of picocells are mixed in a macrocell, which is different from the first embodiment.

In the second embodiment, the muting control unit 203 sets a muting region of the macrocell so as to include all of the REs to which the interference reducing CCEs of all of the picocells are mapped. Therefore, it becomes possible to collectively control interference with the interfered pico UEs in a plurality of the picocells. However, a needed muting region tends to be greater. Therefore, in the third embodiment, the wireless communication system controls interference with the interfered pico UEs in a plurality of picocells while maintaining a small needed muting region. To control the interference as described above, the muting control unit of the macro base station performs muting specifically on an individual picocell for each subframe.

Figure 12:
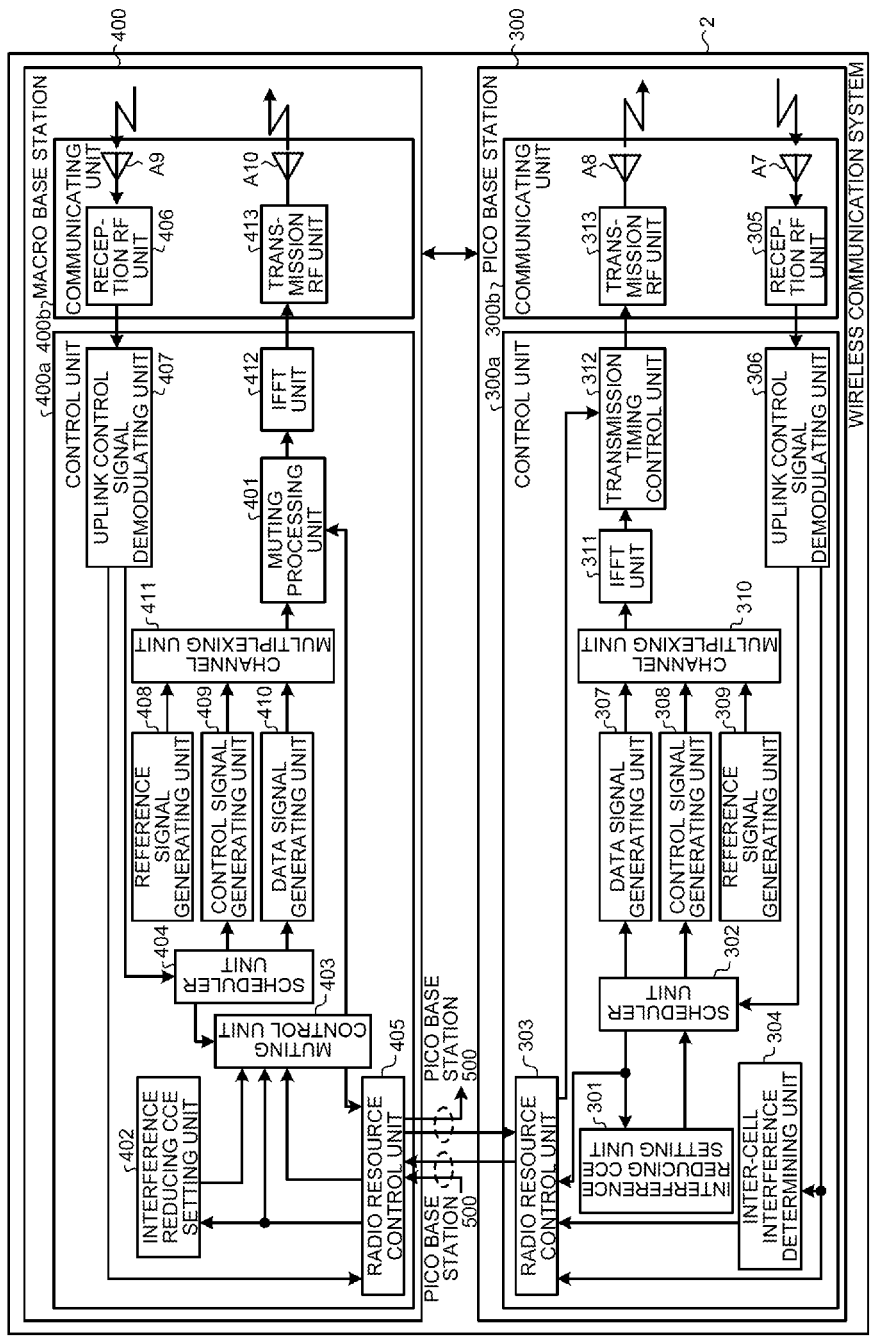
FIG. 12 is a diagram illustrating a configuration of a wireless communication system according to a third embodiment.

A configuration of the wireless communication system according to the third embodiment will be explained below. FIG. 12 is a diagram illustrating a configuration of the wireless communication system according to the third embodiment. As illustrated in FIG. 12, a wireless communication system 2 includes a pico base station 300 and a macro base station 400. The pico base station 300 includes a control unit 300a and a communicating unit 300b. The control unit 300a includes an interference reducing CCE setting unit 301, a scheduler unit 302, a radio resource control unit 303, an inter-cell interference determining unit 304, an uplink control signal demodulating unit 306, and a data signal generating unit 307. The control unit 300a also includes a control signal generating unit 308, a reference signal generating unit 309, a channel multiplexing unit 310, an IFFT unit 311, and a transmission timing control unit 312. The communicating unit 300b includes a reception RF unit 305 and a transmission RF unit 313. All of the components are connected to one another so as to be able to input and output a signal or data unidirectionally or bidirectionally.

Similarly, the macro base station 400 includes a control unit 400a and a communicating unit 400b. The control unit 400a includes a muting processing unit 401, an interference reducing CCE setting unit 402, a muting control unit 403, a scheduler unit 404, a radio resource control unit 405, and an uplink control signal demodulating unit 407. The control unit 400a also includes a reference signal generating unit 408, a control signal generating unit 409, a data signal generating unit 410, a channel multiplexing unit 411, and an IFFT unit 412. The communicating unit 400b includes a reception RF unit 406 and a transmission RF unit 413. All of the components are connected to one another so as to be able to input and output a signal or data unidirectionally or bidirectionally.

The wireless communication system 2 has the same configuration as that of the wireless communication system 1 of the first embodiment. Therefore, the same components are denoted by reference symbols with the same trailing numerals, and detailed explanation thereof will be omitted.

Specifically, the pico base station 300 and the macro base station 400 of the third embodiment are components corresponding to the pico base station 100 and the macro base station 200 of the first embodiment, respectively. The control unit 300a and the communicating unit 300b of the pico base station 300 correspond to the control unit 100a and the communicating unit 100b of the pico base station 100, respectively. Similarly, the control unit 400a and the communicating unit 400b of the macro base station 400 correspond to the control unit 200a and the communicating unit 200b of the macro base station 200, respectively.

The interference reducing CCE setting unit 301, the scheduler unit 302, and the radio resource control unit 303 of the pico base station 300 correspond to the interference reducing CCE setting unit 101, the scheduler unit 102, and the radio resource control unit 103 of the pico base station 100, respectively. The inter-cell interference determining unit 304, the reception RF unit 305, the uplink control signal demodulating unit 306, and the data signal generating unit 307 correspond to the inter-cell interference determining unit 104, the reception RF unit 105, the uplink control signal demodulating unit 106, and the data signal generating unit 107, respectively. The control signal generating unit 308, the reference signal generating unit 309, and the channel multiplexing unit 310 correspond to the control signal generating unit 108, the reference signal generating unit 109, and the channel multiplexing unit 110, respectively. The IFFT unit 311, the transmission timing control unit 312, and the transmission RF unit 313 correspond to the IFFT unit 111, the transmission timing control unit 112, and the transmission RF unit 113, respectively.

Similarly, the muting processing unit 401 and the interference reducing CCE setting unit 402 of the macro base station 400 correspond to the muting processing unit 201 and the interference reducing CCE setting unit 202 of the macro base station 200, respectively. The muting control unit 403, the scheduler unit 404, and the radio resource control unit 405 correspond to the muting control unit 203, the scheduler unit 204, and the radio resource control unit 205, respectively. The reception RF unit 406, the uplink control signal demodulating unit 407, and the reference signal generating unit 408 correspond to the reception RF unit 206, the uplink control signal demodulating unit 207, and the reference signal generating unit 208, respectively. The control signal generating unit 409, the data signal generating unit 410, and the channel multiplexing unit 411 correspond to the control signal generating unit 209, the data signal generating unit 210, and the channel multiplexing unit 211, respectively. The IFFT unit 412 and the transmission RF unit 413 correspond to the IFFT unit 212 and the transmission RF unit 213, respectively.

The configuration of the mobile station is the same as that of the first embodiment, and therefore, explanation thereof will be omitted.

A main difference between the third embodiment and the first embodiment will be explained below. The inter-cell interference determining unit 304 of the pico base station 300 estimates a state of inter-cell interference in each of the mobile stations based on information on the RSRP of each of the cells notified by each of the mobile stations. The inter-cell interference determining unit 304 determines whether to request application of muting based on the estimation result, and generates information on the number of interfered UEs. The inter-cell interference determining unit 304 transfers the information on the number of the interfered UEs to the radio resource control unit 303. The radio resource control unit 303 of the pico base station 300 notifies the radio resource control unit 405 of the macro base station 400 of information on the number of the interfered UEs and a wireless parameter (the number of antennas, a CFI, a cell ID, or Ng) needed to recognize the CCE of the picocell. The radio resource control unit 303 receives information on the amount of time shift and interference reducing subframe information for each of the picocells from the macro base station 400. The scheduler unit 302 of the pico base station 300 allocates a CCE on the SS dedicated for the interfered pico UE to a PDCCH for the interfered pico UE based on the interference reducing subframe information for each of the picocells.

Meanwhile, the muting control unit 403 of the macro base station 400 generates interference reducing subframe information for each of the picocells based on the information on the number of the interfered UEs for each of the picocells. The muting control unit 403 sets a PDSCH RE of a macrocell corresponding to the interference reducing CCE of each of the picocells as the muting region for each of the picocells. The muting control unit 403 notifies the muting processing unit 401 of the muting region information for the picocell, for which an interference reducing subframe is set, for each subframe.

The muting control unit 403 determines the amount of time shift common to all of the picocells, and notifies the radio resource control unit 405 of the amount of time shift together with the interference reducing subframe information for each of the picocells.

The radio resource control unit 405 of the macro base station 400 notifies the radio resource control unit 303 of each of the pico base stations 300 of the information on the amount of time shift and the interference reducing subframe information for each of the picocells, via a wired interface. The radio resource control unit 405 receives the information on the number of interfered UEs and the wireless parameter (the number of antennas, a CFI, a cell ID, or Ng) of each of the picocells from the pico base stations 300. The radio resource control unit 405 also transmits and receives various types of data and signals to and from a pico base station 500.

Figure 13:
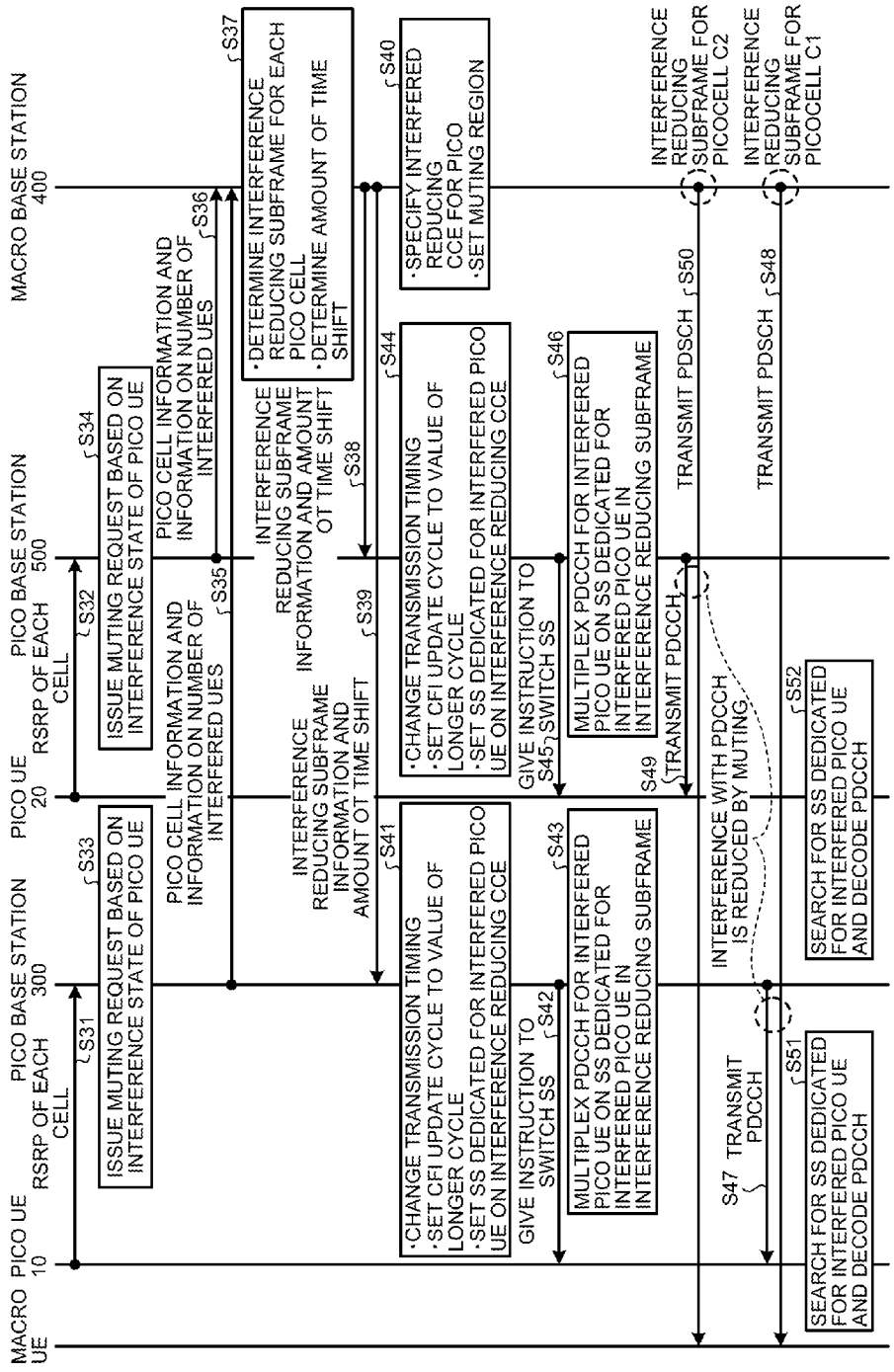
FIG. 13 is a diagram illustrating an operation of the wireless communication system according to the third embodiment.

An operation will be explained below. In the third embodiment, a network environment is assumed in which two picocells are mixed in a macrocell. FIG. 13 is a diagram illustrating an operation of the wireless communication system 2 according to the third embodiment. In the explanation below, a mobile station connected to the pico base station 300 is described as a pico UE 10, a mobile station connected to the pico base station 500 is described as a pico UE 20, and a mobile station connected to the macro base station 400 is described as a macro UE. Furthermore, a picocell formed by the pico base station 300 is described as a picocell C1, and a picocell formed by the pico base station 500 is described as a picocell C2.

At S31, the pico UE 10 measures the received power of the RS of each of the connected cell and the surrounding cells, and notifies the pico base station 300 of the measurement result as the RSRP. The pico UE 20 performs the same process as S31, and notifies the pico base station 500 of the RSRP of each of the cells (S32).

At S33, the pico base station 300 estimates the state of the inter-cell interference of each of the pico UEs based on the information on the RSRP of each of the cells notified by each of the pico UEs, and determines whether to request muting based on the estimation result. The pico base station 500 performs the same estimation process and the determination process (S34). The detailed processing contents are the same as those of the process at S2 in FIG. 9 of the first embodiment, and therefore, detailed explanation thereof will be omitted.

At S35, when requesting application of the muting, the pico base station 300 notifies the macro base station 400 of information on the number of interfered UEs and a wireless parameter (the number of antennas, a CFI, a cell ID, or Ng) needed to recognize the picocell C1. Incidentally, as the information on the number of the interfered UEs, the number of the interfered pico UEs is used that serves as a criterion for determining whether to request muting. The information on the number of the interfered UEs is not limited to the above number, and may be a ratio of the number of the interfered pico UEs to the total number of the pico UEs. At S36, the pico base station 500 performs the same process as S35 on the macro base station.

At S37, the macro base station 400 determines a method for applying the muting based on the information on the number of the interfered UEs and the picocell information obtained from the pico base stations 300 and 500. Specifically, the macro base station 400 defines an interference reducing CCE for each of target picocells, and sets a corresponding PDSCH RE of the macrocell as a muting region. The macro base station 400 also determines the interference reducing CCE for the target picocell and a subframe (interference reducing subframe) in which the muting region is set, based on the information on the number of the interfered UEs. For example, when values indicated by the information on the number of the interfered UEs of the picocells C1 and C2 are p_mute1 and p_mute2, respectively, the macro base station 400 determines the ratio of the number of the interference reducing subframes of the picocells C1 and C2 as (p_mute1: p_mute2). The macro base station 400 generates information (interference reducing subframe information) indicating the position of the interference reducing subframe for each of the picocells C1 and C2 in the subframe based on the above ratio.

FIG. 14 is a diagram illustrating an example of the interference reducing subframe information according to the third embodiment. FIG. 14 illustrates the interference reducing subframe information defined by a 10-subframe cycle when (p_mute1:p_mute2)=(3:7). In FIG. 14, in the subframe number for which "1" is assigned, an interference reducing subframe for a corresponding picocell is set. The macro base station 400 determines the amount of time shift common to the picocells C1 and C2. The amount of time shift is determined as, for example, the CFI of the macrocell or the upper-limit value of the CFI, which is 3.

Referring back to FIG. 13, at S38, the macro base station 400 notifies the pico base station 500 of the interference reducing subframe information and the amount of time shift determined at S37. The pieces of the information are also sent from the macro base station 400 to the pico base station 300 (S39).

At S40, the macro base station 400 specifies the interference reducing CCEs of the pico base stations 300 and 500, and sets the muting regions. At S41, the pico base station 300 changes a transmission timing based on the amount of time shift notified by the macro base station 400 and sets the CFI update cycle to a value of a longer cycle. The pico base station 300 also sets the interference reducing CCE based on a rule shared with the macro base station 400, and sets an SS dedicated for the interfered pico UE on the interference reducing CCE.

At S42, the pico base station 300 notifies the interfered pico UE 10 of an SS switching instruction. The switching instruction is an instruction to switch an SS to be searched for when a PDCCH is decoded, from the normal UE-specific SS to the SS dedicated for the interfered pico UE.

At S43, the pico base station 300 multiplexes a PDCCH on the SS dedicated for the interfered pico UE only when an interference reducing subframe for a picocell is set for the interfered pico UE. As for the pico UEs other than the interfered pico UE, the pico base station 300 multiplexes a PDCCH on the normal UE-specific SS regardless of the setting of the interference reducing subframe for the picocell.

Figure 15:
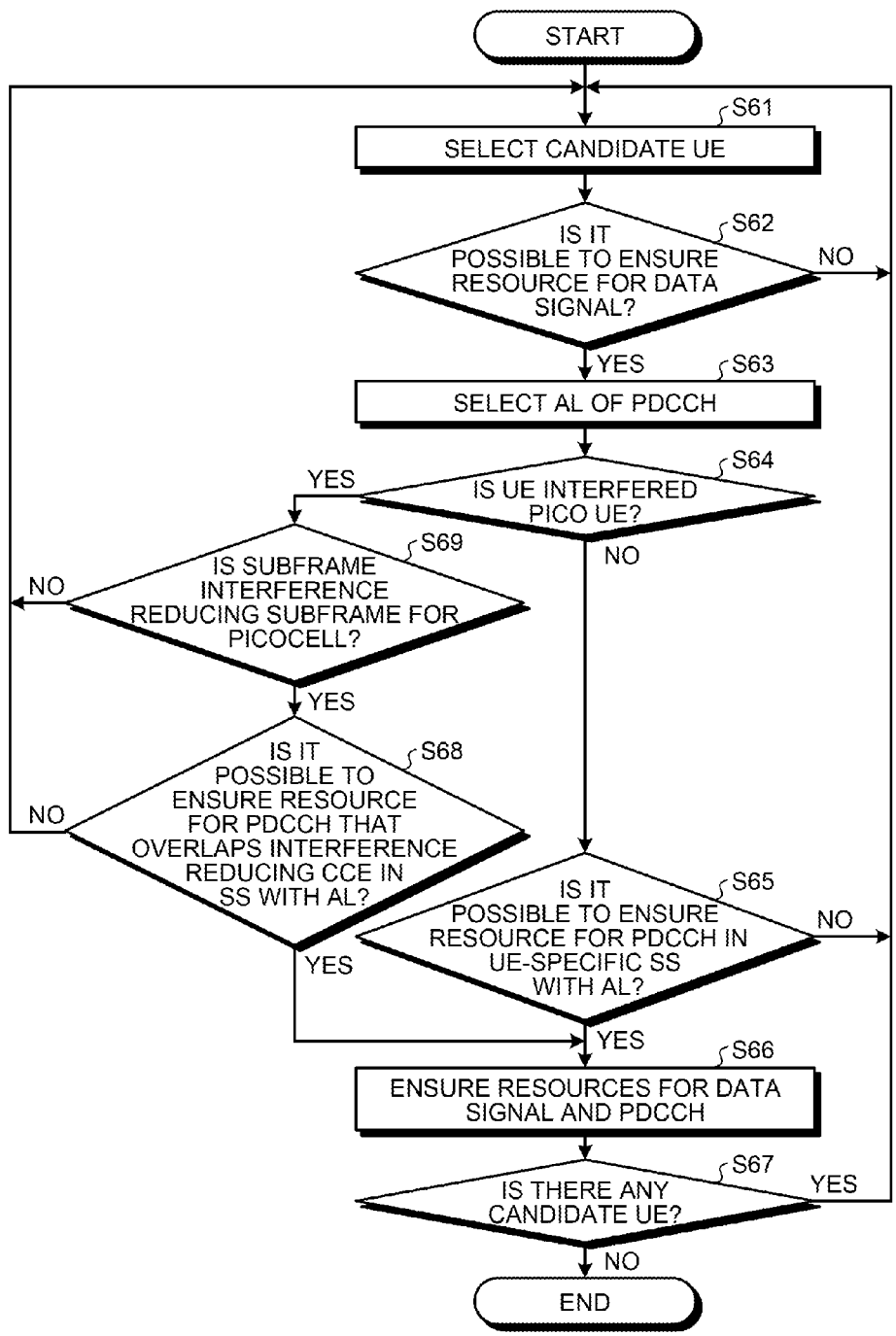
FIG. 15 is a diagram for explaining a scheduling algorithm in a pico base station according to the third embodiment.

A scheduling algorithm according to the third embodiment will be explained below. FIG. 15 is a diagram for explaining the scheduling algorithm of the pico base stations 300 and 500 according to the third embodiment. FIG. 15 is the same as FIG. 11 except for a determination process that is newly added at Step S69. Therefore, detailed explanation of FIG. 15 will be omitted. Steps S61 to S68 in FIG. 15 correspond to Steps S21 to S28 in FIG. 11, respectively.

In the first embodiment, it has been explained that the determination on whether the selected candidate UE is an interfered pico UE (S24 in FIG. 11) is performed, and thereafter determination on whether it is possible to ensure a resource for the PDCCH is performed regardless of a result of the former determination (S25 or S28). By contrast, in the third embodiment, when the UE selected at S61 is an interfered pico UE (YES at S64), each of the pico base stations 300 and 500 determines whether a corresponding subframe is an interference reducing subframe for a corresponding picocell (S69). As a result of the determination, when the subframe is the interference reducing subframe (YES at S69), the process proceeds to S68. On the other hand, when the subframe is not the interference reducing subframe (NO at S69), the process returns to S61 and the processes from S61 are performed again. The processes to be performed when the selected candidate UE is not the interfered pico UE at S64 (NO at S64) are the same as those of the first embodiment.

Referring back to FIG. 13, the pico base station 500 performs the same processes as S41 to S43 described above, based on the interference reducing subframe information and the amount of time shift notified at S38 (S44 to S46).

At S47, the pico base station 300 transmits a PDCCH for the interfered pico UE in the interference reducing subframe for the picocell C1 by using the interference reducing CCE for the picocell C1. At the same time, when the macro base station 400 transmits a PDSCH, muting is performed on the muting region corresponding to the interference reducing CCE for the picocell C1 (S48). Therefore, interference from the macrocell to the PDCCH for the interfered pico UE in the picocell C1 can be reduced.

At S49, the pico base station 500 transmits a PDCCH for the interfered pico UE in the interference reducing subframe for the picocell C2 by using the interference reducing CCE for the picocell C2. At the same time, when the macro base station 400 transmits a PDSCH, muting is performed on a muting region corresponding to the interference reducing CCE corresponding to the picocell C2 (S50). Therefore, interference from the macrocell to the PDCCH for the interfered pico UE in the picocell C2 can be reduced.

At S51, the interfered pico UE 10 searches for the SS dedicated for the interfered pico UE and decodes the PDCCH in response to the transmission of the PDCCH at S47. Similarly, the interfered pico UE 20 searches for the SS dedicated for the interfered pico UE and decodes the PDCCH in response to the transmission of the PDCCH at S49 (S52). The pico UEs other than the UEs 10 and 20 search for the normal UE-specific SS and decode the PDCCH.

In the third embodiment, the picocells C1 and C2 have been explained as representative picocells. Meanwhile, the positions of REs to which the PDCCHs of picocells other than the representative picocells are mapped partially overlap the muting region. Therefore, it is also possible to partially reduce interference with the PDCCH.

As described above, the wireless communication system 2 of the third embodiment includes a plurality of the pico base stations 300 and 500. The pico base station 300 includes the control unit 300a and the communicating unit 300b. The control unit 300a notifies the macro base station 400 of the information needed to specify a CCE to which the interference reducing CCE is mapped and the information on the number of interfered UEs. A case is assumed in which mobile stations connected to the picocells C1 and C2 are interfered with by the macrocell in the interference reducing subframes for the picocells C1 and C2 indicated by the interference reducing subframe information notified by the macro base station 400. In this case, the communicating unit 300b uses the SS dedicated for the interfered pico UE to perform transmission by a PDCCH for the UE, and notifies the UE that the UE-specific SS is switched to the SS dedicated for the interfered pico UE. The mobile station 10 of the picocell searches for the SS dedicated for the interfered pico UE and decodes the PDCCH based on the notification from the pico base station 300. The macro base station 400 includes the control unit 400a and the communicating unit 400b. The control unit 400a sets the interference reducing subframe for each of the picocells C1 and C2 based on the information on the number of the interfered UEs notified by a plurality of the pico base stations 300 and 500, and notifies each of the pico base stations 300 and 500 of the interference reducing subframe information. The communicating unit 400b transmits a null symbol in a resource to which the interference reducing CCE of the picocell is mapped in the interference reducing subframe for each of the picocells C1 and C2. Therefore, in the network environment in which a plurality of the picocells C1 and C2 is mixed in a macrocell, it is possible to apply the time-division muting technology to the wireless communication system of the first embodiment. Therefore, interference from a single macrocell to the PDCCHs of the picocells C1 and C2 can be reduced. In addition, the reception characteristics of the PDSCH of the macrocell can be maintained regardless of the number of the picocells.

In the wireless communication system 2, the control unit 300a of the pico base station 300 notifies the macro base station 400 of information based on the number of the UEs in the wireless channel state of a predetermined quality or lower, as the information on the number of the interfered UEs. The wireless channel state of the predetermined quality or lower indicates, for example, a state in which a measured reception level is equal to or lower than a predetermined value. Therefore, the control unit 300a can issue more appropriate information indicating how many mobile stations are greatly interfered.

In the wireless communication system 2, the control unit 400a of the macro base station 400 sets a ratio of the picocells C1 and C2 with respect to the number of the interference reducing subframes based on the ratio of the picocells C1 and C2 with respect to values indicated by the information on the number of the interfered UEs. Therefore, it is possible to prevent inequality of opportunity for transmission of the PDCCHs of the picocells C1 and C2 between the cells.

Furthermore, in the wireless communication system 2, the control unit 400a of the macro base station 400 sets the interference reducing subframes of the picocells C1 and C2 so that the subframes do not overlap each other. Therefore, the wireless communication system 2 can assuredly apply an optimal interference control process for each of the picocells in each of the subframes.

Moreover, in the wireless communication system 2, the communicating unit 400b of the macro base station 400 transmits a null symbol to the mobile station 10 of the pico base station 300 in response to a request from a pico base station that has issued a request for transmission of the null symbol from among a plurality of the pico base stations 300 and 500. Therefore, muting is performed only on a pico base station for which interference needs to be controlled. Therefore, compared with a case in which the muting is performed on all of the pico base stations, it is possible to reduce processing load on the macro base station 400 due to control of the interference.

Fourth Embodiment

In a fourth embodiment, an example will be explained in which a technology for adaptively controls the interference reducing CCE is applied to the wireless communication system of the first embodiment. Specifically, in the first embodiment, the wireless communication system 1 sets the interference reducing CCE in, for example, the common SS according to the rule common to the macro base station and the pico base station. However, if the interference reducing CCE is fixedly set, when, for example, the number of the interfered pico UEs in the picocell increases, it becomes difficult for the wireless communication system 1 to ensure resources for the PDCCHs of the interfered pico UEs and the throughput of the interfered pico UEs may be reduced. On the other hand, when the number of the interfered pico UEs is small, while the wireless communication system 1 can easily ensure a resource for the PDCCHs of the interfered pico UEs, the number of the PDSCH REs muted in the macrocell becomes excessive. Therefore, a wireless communication system according to a fourth embodiment controls the interference reducing CCE according to the communication status of the picocell.

Figure 16:
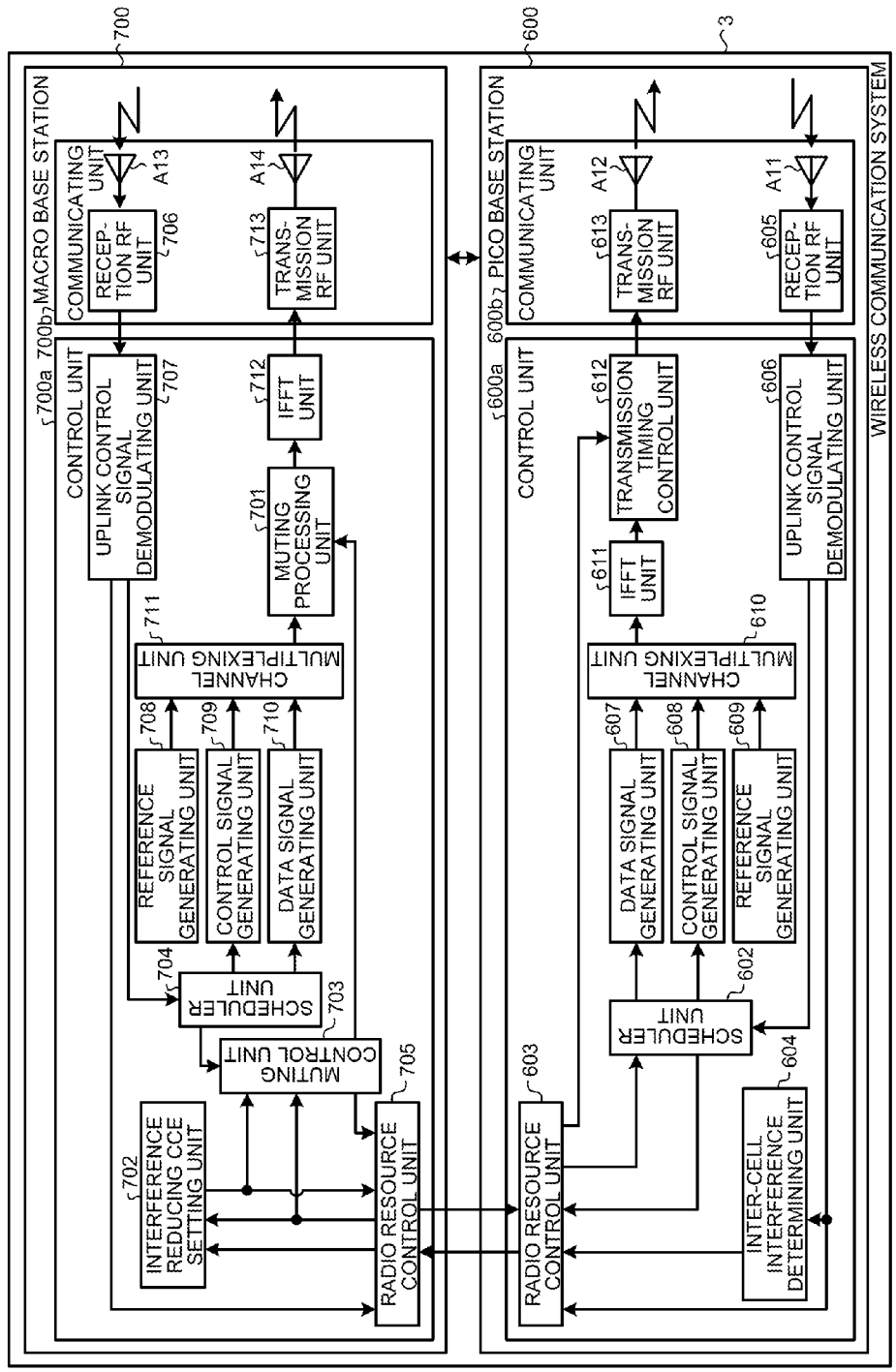
FIG. 16 is a diagram illustrating a configuration of a wireless communication system according to a fourth embodiment.

A configuration of the wireless communication system according to the fourth embodiment will be explained below. FIG. 16 is a diagram illustrating the configuration of the wireless communication system according to the fourth embodiment. As illustrated in FIG. 16, a wireless communication system 3 includes a pico base station 600 and a macro base station 700. The pico base station 600 includes a control unit 600a and a communicating unit 600b. The control unit 600a includes a scheduler unit 602, a radio resource control unit 603, an inter-cell interference determining unit 604, an uplink control signal demodulating unit 606, and a data signal generating unit 607. The control unit 600a also includes a control signal generating unit 608, a reference signal generating unit 609, a channel multiplexing unit 610, an IFFT unit 611, and a transmission timing control unit 612. The communicating unit 600b includes a reception RF unit 605 and a transmission RF unit 613. All of the components are connected to one another so as to be able to input and output a signal or data unidirectionally or bidirectionally.

Similarly, the macro base station 700 includes a control unit 700a and a communicating unit 700b. The control unit 700a includes a muting processing unit 701, an interference reducing CCE setting unit 702, a muting control unit 703, a scheduler unit 704, a radio resource control unit 705, and an uplink control signal demodulating unit 707. The control unit 700a also includes a reference signal generating unit 708, a control signal generating unit 709, a data signal generating unit 710, a channel multiplexing unit 711, and an IFFT unit 712. The communicating unit 700b includes a reception RF unit 706 and a transmission RF unit 713. All of the components are connected to one another so as to be able to input and output a signal or data unidirectionally or bidirectionally.

The wireless communication system 3 has the same configuration as that of the wireless communication system 1 of the first embodiment. Therefore, the same components are denoted by reference symbols with the same trailing numerals, and explanation thereof will be omitted.

Specifically, the pico base station 600 and the macro base station 700 of the fourth embodiment are components corresponding to the pico base station 100 and the macro base station 200 of the first embodiment, respectively. The control unit 600a and the communicating unit 600b of the pico base station 600 correspond to the control unit 100a and the communicating unit 100b of the pico base station 100, respectively. Similarly, the control unit 700a and the communicating unit 700b of the macro base station 700 correspond to the control unit 200a and the communicating unit 200b of the macro base station 200, respectively.

The scheduler unit 602 and the radio resource control unit 603 of the pico base station 600 correspond to the scheduler unit 102 and the radio resource control unit 103 of the pico base station 100, respectively. The inter-cell interference determining unit 604, the reception RF unit 605, the uplink control signal demodulating unit 606, and the data signal generating unit 607 correspond to the inter-cell interference determining unit 104, the reception RF unit 105, the uplink control signal demodulating unit 106, and the data signal generating unit 107, respectively. The control signal generating unit 608, the reference signal generating unit 609, and the channel multiplexing unit 610 correspond to the control signal generating unit 108, the reference signal generating unit 109, and the channel multiplexing unit 110, respectively. Furthermore, the IFFT unit 611, the transmission timing control unit 612, and the transmission RF unit 613 correspond to the IFFT unit 111, the transmission timing control unit 112, and the transmission RF unit 113, respectively.

Similarly, the muting processing unit 701 and the interference reducing CCE setting unit 702 of the macro base station 700 correspond to the muting processing unit 201 and the interference reducing CCE setting unit 202 of the macro base station 200, respectively. The muting control unit 703, the scheduler unit 704, and the radio resource control unit 705 correspond to the muting control unit 203, the scheduler unit 204, and the radio resource control unit 205, respectively. The reception RF unit 706, the uplink control signal demodulating unit 707, and the reference signal generating unit 708 correspond to the reception RF unit 206, the uplink control signal demodulating unit 207, and the reference signal generating unit 208, respectively. The control signal generating unit 709, the data signal generating unit 710, and the channel multiplexing unit 711 correspond to the control signal generating unit 209, the data signal generating unit 210, and the channel multiplexing unit 211, respectively. The IFFT unit 712 and the transmission RF unit 713 correspond to the IFFT unit 212 and the transmission RF unit 213, respectively.

Figure 17:
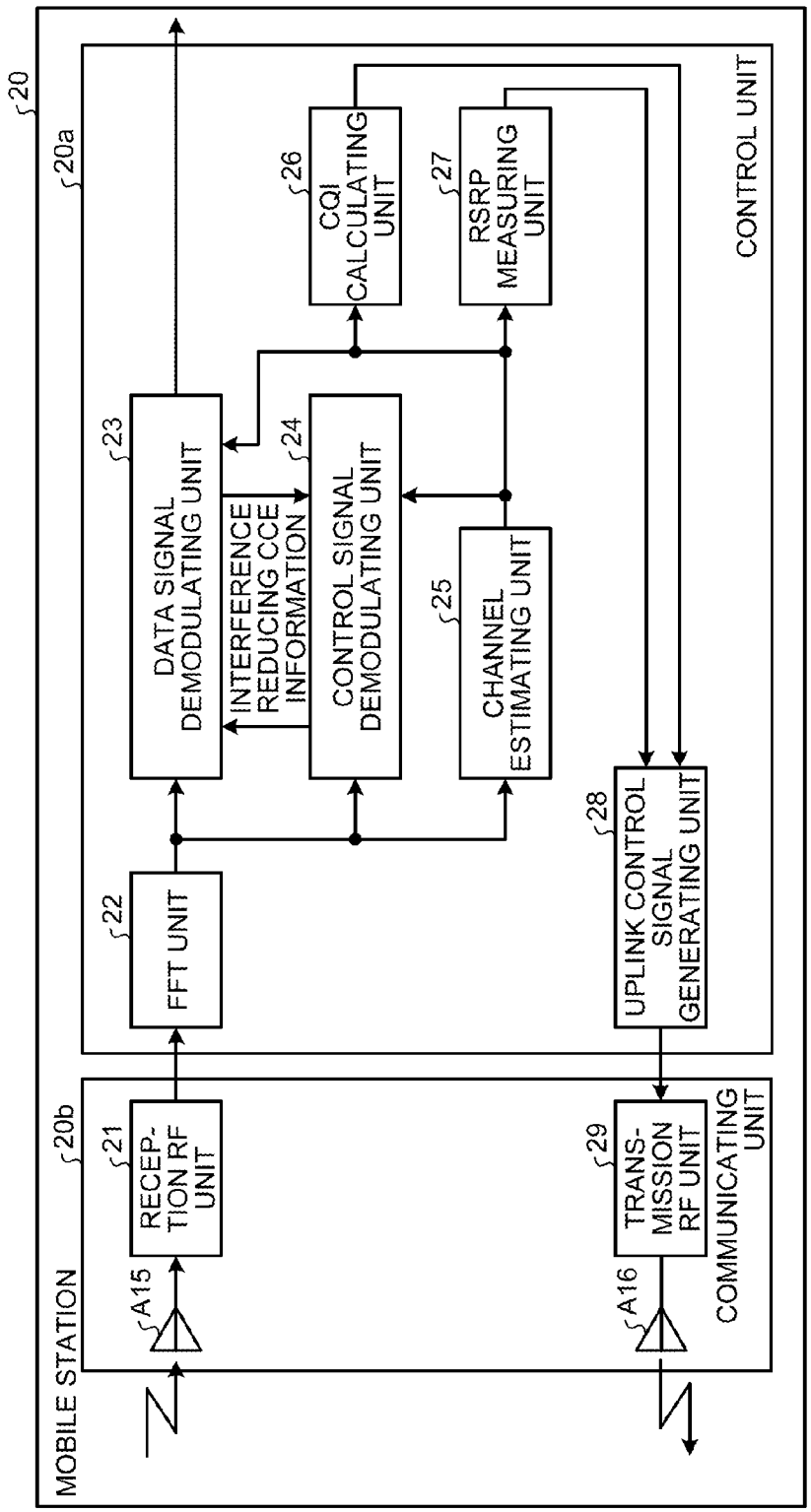
FIG. 17 is a diagram illustrating a configuration of a mobile station according to the fourth embodiment.

A configuration of a mobile station 20 will be explained below. FIG. 17 is a diagram illustrating a configuration of the mobile station according to the fourth embodiment. The mobile station 20 includes a control unit 20a and a communicating unit 20b. The control unit 20a includes an FFT unit 22, a data signal demodulating unit 23, a control signal demodulating unit 24, a channel estimating unit 25, a CQI calculating unit 26, an RSRP measuring unit 27, and an uplink control signal generating unit 28. The communicating unit 20b includes a reception RF unit 21 and a transmission RF unit 29. All of the components are connected to one another so as to be able to input and output a signal or data unidirectionally or bidirectionally.

The mobile station 20 has the same configuration as that of the mobile station 10 of the first embodiment. Therefore, the same components are denoted by reference symbols with the same trailing numerals, and detailed explanation thereof will be omitted. Specifically, the control unit 20a and the communicating unit 20b of the fourth embodiment are components corresponding to the control unit 10a and the communicating unit 10b of the first embodiment, respectively. The FFT unit 22, the data signal demodulating unit 23, the control signal demodulating unit 24, and the channel estimating unit 25 correspond to the FFT unit 12, the data signal demodulating unit 13, the control signal demodulating unit 14, and the channel estimating unit 15, respectively. The CQI calculating unit 26, the RSRP measuring unit 27, and the uplink control signal generating unit 28 correspond to the CQI calculating unit 16, the RSRP measuring unit 17, and the uplink control signal generating unit 18, respectively. Similarly, the reception RF unit 21 and the transmission RF unit 29 correspond to the reception RF unit 11 and the transmission RF unit 19, respectively.

A main difference between the fourth embodiment and the first embodiment will be explained below. The interference reducing CCE setting unit 702 of the macro base station 700 adjusts the interference reducing CCE based on the information on the number of interfered UEs and the picocell information, and notifies the muting control unit 703 and the wireless resource control unit 705 of a result as interference reducing CCE information. The wireless resource control unit 705 of the macro base station 700 notifies the wireless resource control unit 603 of the pico base station 600 of the amount of time shift and the above-described interference reducing CCE information. The wireless resource control unit 603 of the pico base station 600 notifies the scheduler unit 602 of the above-described interference reducing CCE information.

The data signal demodulating unit 23 of the mobile station 20 decodes user data and control information on a higher-level layer. The control information contains the SS switching instruction and the interference reducing CCE information. The control signal demodulating unit 24 specifies the SS dedicated for the interfered pico UE based on the interference reducing CCE information.

Figure 18:
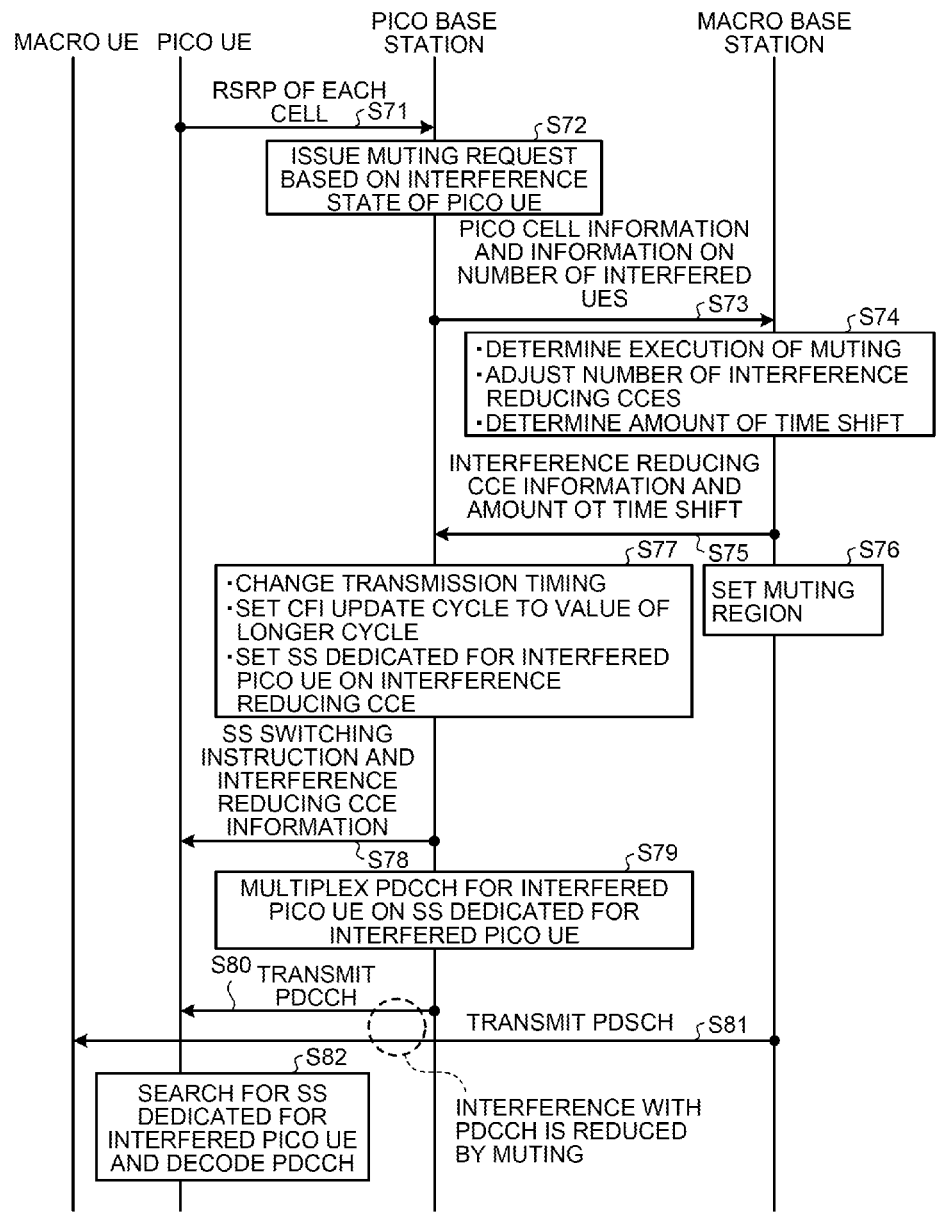
FIG. 18 is a diagram illustrating an operation of the wireless communication system according to the fourth embodiment.

An operation will be explained below. FIG. 18 is a diagram illustrating an operation of the wireless communication system 3 according to the fourth embodiment. FIG. 18 is the same as FIG. 9 except for S73 to S78. Therefore, detailed explanation of FIG. 18 will be omitted and a difference from the first embodiment will be explained below. S71, S72, and S79 to S82 in FIG. 18 correspond to S1, S2, and S9 to S12 in FIG. 9, respectively.

At S73, the pico base station 600 notifies the macro base station 700 of the picocell information (the number of antennas, a CFI, a cell ID, or Ng) and information on the number of interfered UEs (the mobile station). The macro base station 700 adjusts the number of the interference reducing CCEs based on the information on the number of the interfered UEs notified by the pico base station 600 (S74). Specifically, when the number of the interfered UEs indicated by the information on the number of the interfered UEs or the ratio of the number of the interfered UEs is equal to or greater than a predetermined value, the macro base station 700 increases the number of the interference reducing CCEs. On the other hand, when the number of the interfered UEs indicated by the information on the number of the interfered UEs or the ratio of the number of the interfered UEs is smaller than the predetermined value, the macro base station 700 decreases the number of the interference reducing CCEs. The macro base station 700 notifies the pico base station 600 of the information on the number of the interference reducing CCEs adjusted at S74, as interference reducing CCE information, together with the amount of time shift (S75).

The macro base station 700 sets a muting region in accordance with transmission of the interference reducing CCE information and the amount of time shift (S76). The pico base station 600 sets the interference reducing CCE according to the interference reducing CCE information notified by the macro base station 700 at S75 (S77). The pico base station 600 notifies the interfered pico UE 20 of the interference reducing CCE information (S78).

As described above, the wireless communication system 3 of the fourth embodiment includes the pico base station 600 and the macro base station 700. The pico base station 600 includes the control unit 600a. The control unit 600a notifies the macro base station 700 of the information on the number of the interfered UEs, and sets the interference reducing CCE according to the interference reducing CCE information notified by the macro base station 700. The macro base station 700 includes the control unit 700a. The control unit 700a adjusts the number of the interference reducing CCEs based on the information on the number of the interfered UEs notified by the pico base station 600, and notifies the pico base station 600 of the interference reducing CCE information based on the number of the interference reducing CCEs. Therefore, even when the number of the interfered pico UEs in the picocell changes according to time or place, the wireless communication system 3 can ensure adequate resources for the PDCCHs of the interfered pico UEs in the picocell. Furthermore, the amount of the PDSCH REs to be muted in the macrocell can be reduced to a requisite minimum.

In the wireless communication system 3, the control unit 700a of the macro base station 700 increases the number of the interference reducing CCEs when the number of the interfered UEs is equal to or greater than a predetermined value, and decreases the number of the interference reducing CCEs when the number of the interfered UEs is smaller than the predetermined value. Therefore, the number of the interference reducing CCEs is appropriately adjusted according to the communication status of the picocell. Consequently, it becomes possible to control the interference reducing CCEs in just proportion for each of the pico base stations.

In the above embodiments, the wireless communication system disclosed in the present application reduces interference between the macrocell and the picocell. However, the wireless communication systems 1, 2, and 3 are not limited to the above, and may be applied to a technology for reducing interference between a macrocell and a femtocell or interference between a picocell and a femtocell.

According to one embodiment of the wireless communication system disclosed in the present application, it is possible to reduce interference with a control channel while maintaining the reception characteristics of a data channel.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system that controls a transmission timing in each of cells so that a control channel of a first cell and a data channel of a second cell temporally overlap each other, the wireless communication system including a base station of the first cell, a base station of the second cell and a mobile station of the first cell, wherein the base station of the first cell includes a first processor that is configured to execute a first process comprising:
  first notifying the base station of the second cell of information used to specify a resource of the control channel of the first cell, the resource corresponding to a predetermined resource unit;
  first setting the resource of the control channel of the first cell as a first resource, the first resource serving as a decoding object of the mobile station of the first cell and corresponding to at least a part of the predetermined resource unit;

second notifying the mobile station of the first cell of information for decoding the first resource according to a setting of the first resource set by the first setting; and first transmitting a control signal to the mobile station of the first cell by using the first resource, the base station of the second cell includes a second processor that executes a second process comprising:

second transmitting a null symbol by using a second resource of the data channel of the second cell, the second resource corresponding to the predetermined resource unit, and the mobile station of the first cell includes a third processor that executes a third process comprising:

receiving the control signal transmitted by the base station of the first cell via the first resource.

2. The wireless communication system according to claim 1, wherein the predetermined resource unit is one or more control channel elements, and the first resource serving as the decoding object is a search space dedicated for the mobile station of the first cell.

3. The wireless communication system according to claim 1, further comprising a plurality of the first cells, wherein the second process further comprises calculating, for each of the first cells of the plurality, a resource unit to which a predetermined resource unit of each of the first cells is mapped, based on a wireless parameter of each of the first cells, and the second transmitting transmits, by a same subframe, a null symbol in all of the resource units calculated at the calculating.

4. The wireless communication system according to claim 1, further comprising a plurality of the base stations of the first cells, wherein the first notifying notifies the base station of the second cell of information needed to specify a resource to which the predetermined resource unit is mapped and of information on a number of interfered mobile stations, the first transmitting performs transmission by a control channel for a mobile station by using a dedicated resource when the mobile station connected to any of the first cell is interfered with by the second cell in an interference reducing subframe for the corresponding first cell indicated by interference reducing subframe information notified by the base station of the second cell, and notifies the mobile station that a resource serving as a decoding object and being specific to the mobile station is switched to the dedicated resource, the second transmitting transmits a null symbol in a resource to which a predetermined resource unit of each of the first cells is mapped in the interference reducing subframe for each of the first cells, wherein the second process further comprises:

second setting an interference reducing subframe for each of the first cells based on the information on the number of the interfered mobile stations notified by the base stations of the first cells; and third notifying the base stations of the first cells of the interference reducing subframe information, and wherein the third process further comprises searching for the dedicated resource and decoding the control channel based on the notification from the base station of the first cell.

5. The wireless communication system according to claim 4, wherein the first notifying notifies the base station of the second cell of information on the number of mobile stations that are in a wireless channel state of a predetermined quality or lower, as the information on the number of the interfered mobile stations.

6. The wireless communication system according to claim 4, wherein the second setting sets a ratio between the first cells with regard to the number of the interference reducing subframes, based on a ratio between the first cells with regard to a value indicated by the information on the number of the interfered mobile stations.

7. The wireless communication system according to claim 4, wherein the second setting sets the interference reducing subframes of the respective first cells so that the interference reducing subframes do not overlap each other.

8. The wireless communication system according to claim 4, wherein the first notifying notifies the base station of the second cell of a wireless parameter of each of the first cells as information needed to specify a resource to which the predetermined resource unit is mapped, and the second setting specifies a resource to which a predetermined resource unit of each of the first cells is mapped, based on information on the wireless parameter notified by each of the base stations of the first cells.

9. The wireless communication system according to claim 1, wherein the first setting sets a dedicated resource at a position in the predetermined resource unit.

10. The wireless communication system according to claim 1, wherein the first setting sets a dedicated resource at an individual position for each of mobile stations of the first cell.

11. The wireless communication system according to claim 1, wherein the first setting sets a dedicated resource at a position shared with mobile stations of the first cell.

12. The wireless communication system according to claim 1, wherein the first setting sets a predetermined resource unit of the first cell so that the predetermined resource unit overlaps a common resource serving as a decoding object of the first cell.

13. The wireless communication system according to claim 4, wherein the first notifying notifies the base station of the second cell of the number of interfered mobile stations, the first setting sets a predetermined resource unit according to information on an interference reducing resource unit notified by the base station of the second cell, the second setting adjusts the number of predetermined resource units based on the number of the interfered mobile stations notified by the base station of the first cell, and the third notifying notifies the base station of the first cell of information on an interference reducing resource unit based on the number of the predetermined resource units.

14. The wireless communication system according to claim 13, wherein the second setting increases the number of the predetermined resource units when the number of the interfered mobile stations is equal to or greater than a predetermined value, and decreases the number of the predetermined resource units when the number of the interfered mobile stations is smaller than the predetermined value.

15. The wireless communication system according to claim 4, wherein upon receiving a request for transmission of the null symbol from any of the base stations of the first cells, the second transmitting transmits a null symbol to a mobile station of the corresponding base station of the first cell.

16. A base station of a first cell in a wireless communication system that controls a transmission timing in each cell so that a control channel of the first cell and a data channel of a second cell temporally overlap each other, the base station comprising a processor, wherein the processor is configured to execute a process comprising:

notifying a base station of the second cell of information used to specify a resource of the control channel of the first cell, the resource corresponding to a predetermined resource unit;

setting a resource of the control channel of the first cell as a first resource, the first resource serving as a decoding object of a mobile station of the first cell and corresponding to at least a part of the predetermined resource unit;

notifying the mobile station of the first cell of information for decoding the first resource according to a setting of the first resource made by the control unit; and transmitting a control signal to the mobile station of the first cell by using the first resource.

17. A wireless communication method implemented by a wireless communication system for controlling a transmission timing in each cell so that a control channel of a first cell and a data channel of a second cell temporally overlap each other, the wireless communication method comprising:

notifying, by a base station of the first cell, a base station of the second cell of information used to specify a resource of the control channel of the first cell, the resource corresponding to a predetermined resource unit;

setting, by the base station of the first cell, a resource of the control channel of the first cell as a first resource, the first resource serving as a decoding object of a mobile station of the first cell and corresponding to at least a part of the predetermined resource unit;

notifying, by the base station of the first cell, the mobile station of the first cell of information for decoding the first resource according to the first resource set at the setting;

transmitting, by the base station of the first cell, a control signal to the mobile station of the first cell by using the first resource;

transmitting, by the base station of the second cell, a null symbol by using a second resource of the data channel of the second cell, the second resource corresponding to the predetermined resource unit;

receiving, by the mobile station of the first cell, the control signal transmitted by the base station of the first cell via the first resource.

\* \* \* \* \*